US012603832B2

(12) United States Patent
Rajagopalan et al.

(10) Patent No.: US 12,603,832 B2
(45) Date of Patent: Apr. 14, 2026

(54) RESOURCE RESERVATION PROTOCOL (RSVP) U-TURN DETOUR LABEL SWITCHED PATH (LSP)

(71) Applicant: Juniper Networks, Inc., Sunnyvale, CA (US)

(72) Inventors: Balaji Rajagopalan, Bangalore (IN); Chandrasekar Ramachandran, Bangalore (IN); Vali Mohammed Sunesara, Mumbai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 96 days.

(21) Appl. No.: 18/401,459

(22) Filed: Dec. 30, 2023

(65) Prior Publication Data

US 2025/0150383 A1    May 8, 2025

(30) Foreign Application Priority Data

Nov. 7, 2023    (IN) .............................. 202341075971

(51) Int. Cl.
H04L 45/00        (2022.01)
H04L 45/28        (2022.01)
H04L 45/50        (2022.01)

(52) U.S. Cl.
CPC .............. H04L 45/22 (2013.01); H04L 45/28 (2013.01); H04L 45/50 (2013.01)

(58) Field of Classification Search
CPC ....... H04L 45/50; H04L 45/123; H04L 45/24; H04L 45/34; H04L 45/02; H04L 45/125; H04L 45/22; H04L 45/28; H04L 41/122; H04L 45/42; H04L 45/16; H04L 12/1863;

H04L 41/0806; H04L 41/0896; H04L 45/64; H04L 47/15; H04L 47/724; H04L 41/0654; H04L 41/0813; H04L 41/0816; H04L 41/082; H04L 41/0886; H04L 41/0895; H04L 41/40; H04L 45/04; H04L 45/124; H04L 47/125; H04L 47/20; H04L 45/00; H04L 12/2876; H04L 12/44; H04L 41/022; H04L 41/0668; H04L 41/0853; H04L 41/0893; H04L 41/12; H04L 41/5054; H04L 43/0811; H04L 45/03; H04L 45/033; H04L 45/08; H04L 45/12; H04L 45/247; H04L 45/30; H04L 45/302; H04L 47/50; H04L 65/612; H04L 67/10;

(Continued)

(56) References Cited

U.S. PATENT DOCUMENTS

2005/0073958 A1*  4/2005  Atlas ........................ H04L 45/12
                                                           370/238
2008/0304494 A1*  12/2008  Yokoyama ............ H04W 48/02
                                                           370/400

(Continued)

OTHER PUBLICATIONS

Extended European Search Report to counterpart European Patent Application Serial No. 24169745.7-1218, dated Oct. 1, 2024.

*Primary Examiner* — Djenane M Bayard
(74) *Attorney, Agent, or Firm* — John C. Pokotylo; Pokotylo Patent Services

(57) ABSTRACT

U-Turn detour paths, though the head-end router of a primary label switched path (LSP), are configured and used to enable fast failover to a secondary LSP, while avoiding reserving bandwidth (e.g., on links unused by primary and secondary paths) unnecessarily.

20 Claims, 17 Drawing Sheets

(58) Field of Classification Search
CPC ..... H04L 67/14; H04L 45/507; H04L 47/825;
H04L 12/4633; H04L 47/76; H04L 45/74;
H04L 47/728; H04L 45/745; H04L 47/70;
H04L 2212/00; H04L 41/0663; H04L
41/0836; H04L 45/38
See application file for complete search history.

(56) References Cited

U.S. PATENT DOCUMENTS

| | | | |
|---|---|---|---|
| 2011/0038380 A1* | 2/2011 | Li | H04L 12/4633 |
| | | | 370/401 |
| 2017/0134268 A1* | 5/2017 | Easale | H04L 45/50 |
| 2018/0351787 A1* | 12/2018 | Boyapati | H04L 41/0661 |
| 2020/0014585 A1* | 1/2020 | Agarwal | H04L 41/0668 |

* cited by examiner

100

100'

500a

RESOURCE RESERVATION PROTOCOL (RSVP) U-TURN DETOUR LABEL SWITCHED PATH (LSP)

§ 1. RELATED APPLICATION(S)

This application claims priority to Indian Provisional Application No. 202341075971, filed on Nov. 7, 2023, titled "RSVP U-TURN DETOUR LSP", and listing Balaji Rajagopalan, Chandrasekar Ramachandran, and Vali Mohammed Sunesara as the inventors (referred to as "the '971 application" and incorporated herein by reference). The present application is not limited to any specific embodiments or requirements of the '971 application.

§ 2. BACKGROUND OF THE INVENTION §

§ 2.1 Field of the Invention

The present application concerns communications networks. In particular, the present application concerns communications networks in which a path, such as a label-switched path (LSP) for example, has reserved resources (such as bandwidth), and protecting such a path.

§ 2.2 Background Information

Although the Resource Reservation Protocol (RSVP) and its extensions are well-understood by those skilled in the art, they are introduced here for the reader's convenience.

§ 2.2.1 Introduction to RSVP

RSVP is a signaling protocol that handles bandwidth allocation and true traffic engineering (TE) across a multiprotocol label switched (MPLS) network. RSVP uses discovery messages and advertisements to exchange LSP path information between all hosts. However, RSVP also includes a set of features that control the flow of traffic through an MPLS network. Whereas some signaling protocols are restricted to using the configured Interior Gateway Protocol's ("IGP's") shortest path as the transit path through the network, RSVP uses (i) a Constrained Shortest Path First ("CSPF") algorithm, and/or (ii) Explicit Route Objects ("EROs"), to determine how traffic is routed through the network.

RSVP uses unidirectional and simplex flows through the network to perform its function. The inbound (ingress) router of the LSP initiates an RSVP path message and sends it downstream to the outbound (egress) router. The path message contains information about the resources needed for the connection. Each router along the path begins to maintain information about a reservation.

When the path message reaches the egress router, resource reservation begins. The egress router sends a reservation message upstream to the inbound (also referred to as "ingress" or "head-end") router. Each router along the path receives the reservation message and sends it upstream, following the path of the original path message. When the ingress router receives the reservation message, the unidirectional network path is established.

More specifically, each sender host transmits path messages downstream along the routes provided by the unicast and multicast routing protocols. Path messages follow the exact paths of application data, creating path states in the routers along the way, thus enabling routers to learn the previous-hop and next-hop node for the session. Path messages are sent periodically (at a configurable interval) to refresh path states. Each receiver host sends reservation request (Resv) messages upstream toward senders and sender applications. Resv messages follow exactly the reverse path of path messages. Resv messages create and maintain a reservation state in each router along the way. Resv messages are sent periodically (at a configurable interval) to refresh reservation states.

Path Tear messages may be used to remove (tear down) path states as well as dependent reservation states in any routers along a path. ResvTear messages remove reservation states along a path. These messages travel upstream toward senders of the session. When path errors occur (usually because of parameter problems in a path message), the router may send a unicast PathErr message to the sender that issued the path message. When a reservation request fails, a ResvErr error message may be delivered to all the receivers involved. Receivers can request confirmation of a reservation request, and this confirmation may be sent with a ResvConfirm message.

The established path remains open as long as the RSVP session is active. The session is maintained by the transmission of additional path and reservation messages that report the session state periodically (e.g., every 30 seconds). If a router does not receive the maintenance messages for a predetermined time (e.g., 3 minutes), it terminates the RSVP session and reroutes the LSP through another active router.

When a bandwidth reservation is configured, reservation messages propagate the bandwidth value throughout the LSP. Routers must reserve the bandwidth specified across the link for the particular LSP. If the total bandwidth reservation exceeds the available bandwidth for a particular LSP segment, the LSP is rerouted through another LSR. If no segments can support the bandwidth reservation, LSP setup fails, and the RSVP session is not established.

Explicit Route Objects (EROs) may be used to limit LSP routing to a specified list of LSRs. By default, RSVP messages follow a path that is determined by the network IGP's shortest path. However, in the presence of a configured ERO, the RSVP messages follow the path specified. EROs consist of two types of instructions: (1) loose hops; and (2) strict hops. When a loose hop is configured, it identifies one or more transit LSRs through which the LSP must be routed. The network IGP determines the exact route from the inbound router to the first loose hop, or from one loose hop to the next. The loose hop specifies only that a particular LSR be included in the LSP. When a strict hop is configured, it identifies an exact path through which the LSP must be routed. Strict-hop EROs specify the exact order of the routers through which the RSVP messages are sent. Loose-hop and strict-hop EROs may be configured simultaneously. In this case, the IGP determines the route between loose hops, and the strict-hop configuration specifies the exact path for particular LSP path segments.

Whereas IGPs use the Shortest Path First (SPF) algorithm to determine how traffic is routed within a network, RSVP uses the Constrained Shortest Path First (CSPF) algorithm to calculate traffic paths that are subject to one or more of the following constraints: (1) LSP attributes (e.g., administrative groups such as link coloring, bandwidth requirements, and EROs); and Link attributes (e.g., colors on a particular link and available bandwidth). These constraints are maintained in the traffic engineering database (TED). The database provides CSPF with up-to-date topology information, the current reservable bandwidth of links, and the link colors.

In determining which path to select, CSPF, (1) Computes LSPs one at a time, beginning with the highest priority LSP—the one with the lowest setup priority value. Among LSPs of equal priority, CSPF starts with those that have the highest bandwidth requirement.

(2) Prunes the traffic engineering database of links that are not full duplex and do not have sufficient reservable bandwidth.

(3) If the LSP configuration includes the include statement, prunes all links that do not share any included colors.

(4) If the LSP configuration includes the exclude statement, prunes all links that contain excluded colors. If a link does not have a color, it is accepted.

(5) Finds the shortest path toward the LSP's outbound router, considering any EROs.

(6) If several paths have equal cost, chooses the one with a last-hop address the same as the LSP's destination.

(7) If several equal-cost paths remain, selects the path with the least number of hops.

(8) If several equal-cost paths remain, applies CSPF load-balancing rules configured on the LSP.

RSVP monitors the status of the interior gateway protocol (IGP) (e.g., IS-IS or OSPF) neighbors and relies on the IGP protocols to detect when a node fails. If an IGP protocol declares a neighbor down (because hello packets are no longer being received), RSVP also brings down that neighbor. However, the IGP protocols and RSVP still act independently when bringing a neighbor up. When the node fails or a node failure is detected, a path error message is generated, and although the RSVP session goes down, the IGP neighbors remain up. RSVP hellos can be relied on when the IGP does not recognize a particular neighbor.

The document, D. Awduche, et al, "RSVP-TE: Extensions to RSVP for LSP Tunnels," *Request for Comments:* 3209 (Internet Engineering Task Force, December 2001) (referred to as "RFC 3209" and incorporated herein by reference) describes the use of RSVP, including all the necessary extensions, to establish LSPs in MPLS. Since the flow along an LSP is completely identified by the label applied at the ingress node of the path, these paths may be treated as "tunnels." A key application of LSP tunnels is traffic engineering with MPLS. RFC 3209 proposes several additional objects that extend RSVP, allowing the establishment of explicitly routed label switched paths using RSVP as a signaling protocol. The result is the instantiation of label-switched tunnels which can be automatically routed away from network failures, congestion, and bottlenecks.

Section 4.3 of RFC 3209 describes EROs, already introduced above. Further, section 4.4 of RFC 3209 describes a Record Route Object (RRO). RROs allow routes to be recorded. Optionally, labels may also be recorded. An RRO collects up-to-date detailed path information hop-by-hop about RSVP sessions, thereby providing valuable information to the sender or receiver. Any path change (due to network topology changes) will be reported. An RRO can be thought of as a complement to an ERO. That is, an ERO can define, explicitly, where an LSP needs to go, whereas an RRO defines, explicitly, where the LSP has gone.

§ 2.2.2 Introduction to Fast Reroute Extensions to RSVP-TE for LSP Tunnels

The document, P. Pan, G. Swallow, and A. Atlas, Eds., "Fast Reroute Extensions to RSVP-TE for LSP Tunnels," *Request for Comments:* 4090 (Internet Engineering Task Force, May 2005) (referred to as "RFC 4090" and incorporated herein by reference) defines RSVP-TE extensions to establish backup LSP tunnels for local repair of LSP tunnels. The extensions described in RFC 4090 are intended to meet the needs of real-time applications such as voice over IP, for which user traffic should be redirected onto backup LSP tunnels in tens of milliseconds. This timing requirement can be satisfied by computing and signaling backup LSP tunnels in advance of failure and by re-directing traffic as close to the failure point as possible. In this way, the time for redirection includes no path computation and no signaling delays, including delays to propagate failure notification between label-switched routers (LSRs). Speed of repair is the primary advantage of the methods and extensions described in RFC 4090. The terms "local repair" or "local protection" are used when referring to techniques that re-direct traffic to a backup LSP tunnel in response to a local failure.

A protected LSP is an explicitly-routed LSP that is provided with protection. The repair methods described in RFC 4090 are applicable to explicitly-routed LSPs.

RFC 4090 defines two local repair methods: (a) a one-to-one backup method that creates "detour" LSPs for each protected LSP at each potential point of local repair; and (2) a facility backup method that creates a bypass tunnel to protect a potential failure point and protect a set of LSPs that have similar backup constraints. Both methods can be used to protect links and nodes during network failure. The present application is concerned with the one-to-one backup method that creates detour LSPs, for reasons discussed below. If the one-to-one backup method is used and a DETOUR object is included, the LSRs in the traffic-engineered network should support the DETOUR object, so that a Path message containing the DETOUR object is not rejected.

In the one-to-one backup method, a point of local repair ("PLR") computes a separate backup LSP, called a "detour LSP," for each LSP that the PLR protects. In the one-to-one backup method, an LSP is established that intersects the original (i.e., protected) LSP somewhere downstream of the point of link or node failure. A separate backup LSP is established for each LSP that is backed up. When a failure occurs along the protected LSP, the PLR redirects traffic onto the local detour.

To protect an LSP that traverses N nodes fully, there could be as many as (N–1) detours. To minimize the number of LSPs in the network, it is desirable to merge a detour back to its protected LSP, when feasible. When a detour LSP intersects its protected LSP at an LSR with the same outgoing interface, they will be merged.

RFC 4090 defines two additional objects—FAST_REROUTE and DETOUR—to extend RSVP-TE to support fast-reroute signaling. These new objects are carried in RSVP Path messages. The details of these new objects are not described in this application. RFC 4090 also extends the SESSION_ATTRIBUTE and RECORD_ROUTE objects to support bandwidth and node protection features. These extended objects are not described in this application.

§ 2.2.3 Challenges to Providing Fast, Local Protection of LSP Tunnels Under RSVP The example communications network topology 100 of FIG. 1 is used to illustrate challenges when providing fast, local, protection of LSP tunnels under RSVP. In FIG. 1, nodes (e.g., routers) R1-R6 are depicted by rectangles and communications links between nodes are depicted by solid lines. Consider the example topology 100 deployed in a region of network that is migrating away from optical transport networks, operated by personnel well acquainted with transport network paradigms. The network operator wants to emulate transport network characteristics in the MPLS network, including strict 50 ms traffic restoration time upon failures.

Referring next to FIG. 2, in the configured network 100', node R1 has a bandwidth-assigned RSVP tunnel to node R6 consisting of two paths: a primary path 210 that traverses R1, R2, R3, R6, and a disjoint secondary path 220 that traverses R1, R4, R5, R6. The secondary path 220 is pre-setup with full bandwidth so that node R1 can switch over to the secondary path if the primary path fails. More specifically, node R1 can use the secondary path 220 for global repair, either by detecting path failure through multi-hop Bidirectional Forwarding Detection ("BFD") or using RSVP signaling, but it cannot restore traffic in under 50 ms. So, transit routers need to handle failures locally, during the short period node R1 switches over to the pre-signaled secondary path. To achieve this, RSVP offers two local protection mechanisms: (1) "bypass"-style that offers many-to-one protection; and (2) "detour"-style that offers one-to-one protection.

Bypass LSPs do not accommodate constraints of all the protected LSP's. Detours, on the other hand, closely track the constraints of the protected LSP, including bandwidth reservation. Network operators often prefer to use detour-style protection to preserve transport network-like behavior. Unfortunately, however, using detours causes a new problem. That is, because detours reserve as much bandwidth as the LSPs they protect, they can consume bandwidth on links that are unused by the tunnel. Detour LSPs originating from the transit routers along the path can traverse different paths, consuming bandwidth on many links across the network. Network operators would like to avoid this.

Referring to the network scenario 300a of FIG. 3A, if the link between R2 and R3 goes down (as indicated by the "X"), R2 may use detour path 310a through R5. Referring to the network scenario 300b of FIG. 3B, if the link between R3 and R6 goes down (as indicated by the "X"), R3 may use detour path 310b through R5. Referring to the network scenario 300c of FIG. 3C, if the link between R4 and R5 goes down (as indicated by the "X"), R4 may use detour path 310c through R3. Finally, referring to the network scenario 300d of FIG. 3D, if the link between R5 and R6 goes down (as indicated by the "X"), R5 may use detour path 310d through R3. Naturally, there may be other detour LSPs originated by R2, R3, R4 and R5, omitting the detour originated by R1.

If RSVP shared-explicit mode is in use, the detour LSPs will share bandwidth with the primary path 210 and the secondary path 220. However, there is no way to prevent the detour LSP from traversing over a link that is not already used by the primary or secondary paths. Such links will reserve additional bandwidth. Unfortunately, such detour links may reserve bandwidth that is not used.

As can be appreciated from the forgoing discussion, it would be useful to configure detour paths to enable fast failover, while avoiding reserving bandwidth unnecessarily.

§ 3. SUMMARY OF THE INVENTION

U-Turn detour paths, though the head-end router of a primary label switched path (LSP), are configured and used to enable fast failover to a secondary LSP, while avoiding reserving bandwidth (e.g., on links unused by primary and secondary paths) unnecessarily. This may be done by providing an example method for use by a head-end router for facilitating the establishment of detours in a primary path of an RSVP tunnel from the head-end router to an egress router, the primary path to include at least one transit router between the head-end router and the egress router. The example method may include: (a) configuring the primary path to use detour local protection; (b) generating, by the head-end router, a message including (1) first data indicating whether or not a "U-Turn" label switched path (LSP) is available in the head-end router, and (2) second data indicating that the head-end router would like each of the at least one transit router in the primary path to perform a U-Turn when computing a detour LSP such that the detour LSP may only include routers on the primary path between the transit router and the head-end router; and (c) transmitting the message for receipt by each of the at least one transit router in the primary path. The example method may further include: (d) configuring the head-end router to establish a secondary path of the RSVP tunnel to be in hot standby mode to the primary path.

In some example implementations of the example method, bandwidth reserved on the secondary path corresponds to bandwidth reserved on the primary path.

Some example implementations of the example method further including: (e) signaling, by the head-end router, availability of the secondary path to each of the at least one transit router in the primary path.

In some example implementations of the example method, the message is expressed by setting flags of a FAST_REROUTE object. For example, the first data may be a first flag in the FAST-REROUTE object, and the second data may be a second flag in the FAST_REROUTE object. The first flag may indicate whether or not the head-end router desires U-Turn detour, and the second flag may indicate whether or not a U-Turn detour is available based on whether or not the secondary path is active. The FAST_REROUTE object may be provided with "pass-through" semantics so that any routers that do not recognize the FAST_REROUTE object will forward it without any modification.

In some example implementations of the example method, the message is a FAST_REROUTE object having a custom defined C-type.

In some example implementations of the example method, the message is included in an RSVP session attribute object.

In some example implementations of the example method, the RSVP tunnel is identified by an RSVP session object.

In some example implementations of the example method, the message is included in an RSVP PATH message.

Some example implementations of the example method further include: (d) receiving, by the head-end router, a PATH message of a U-Turn detour LSP computed through it; and (e) responsive to receiving the PATH message of the U-Turn detour LSP, merging, by the head-end router, the received U-Turn detour LSP with any detour LSP of the RSVP tunnel that has a common next hop with the received U-Turn detour LSP. In such example methods, the detour path computation logic of the head-end router may be configured to re-use paths of other LSPs in the same RSVP tunnel.

An example method for use by a transit router, for facilitating the establishment detours in a primary path, to include the transit router, in an RSVP tunnel from a head-end router to an egress router, include: (a) receiving, by the transit router, a message including (1) first data indicating that a "U-Turn" label switched path (LSP) is available in the head-end router, and (2) second data indicating that the head-end router would like the transit router in the primary path to perform a U-Turn when computing a detour LSP such that the detour LSP may only include routers on the primary path between the transit router and the head-end router; (b) responsive to receiving the message, computing, by the transit router, a U-Turn detour LSP (1) using a reverse path of the primary path, from the transit router to the head-end router, and (2) leaving a last hop of the U-turn detour LSP "loose" so that the head-end router can merge it with a secondary path in the RSVP tunnel.

In some example implementations of the example method by the transit router, the reverse path of the primary path, from the transit router to the head-end router is retrieved from a Record Route Object (RRO).

Some example implementations of the example method by the transit router further include: (c) detecting, by the transit router, that a next downstream node on the primary path is not reachable; and (d) responsive to detecting that the next downstream node on the primary path is not reachable, sending any traffic received on the primary path onto the U-Turn detour LSP.

An example system includes (a) a head-end router with (1) a primary path of an RSVP tunnel to an egress router, and (2) a secondary path of the RSVP tunnel to the egress router, wherein the secondary path is disjoint from the primary path; and (b) at least one transit router on the primary path between the head-end router and the egress router, wherein one of the at least one transit router on the primary path is configured such that, responsive to determining that a next link or a next node on the primary path is unavailable for forwarding, the one of the at least one transit router performs a U-Turn detour of any packets received on the primary path so that the packets are sent back to the head-end router without using nodes or links not on the primary path.

In some example implementations of the example system, the head-end router is configured such that, responsive to receiving the packets that were subject to the U-Turn detour, the head-end router forwards the packets to the egress router via the secondary path.

In some example implementations of the example system, bandwidth reserved on the secondary path corresponds to bandwidth reserved on the primary path.

Parts of the example methods may be performed on a head-end router, and/or on a transit router.

A non-transitory computer-readable medium may store processor-executable instructions for performing any of the foregoing methods.

§ 4. BRIEF DESCRIPTION OF THE DRAWINGS

§ 5. DETAILED DESCRIPTION

Figure 1:
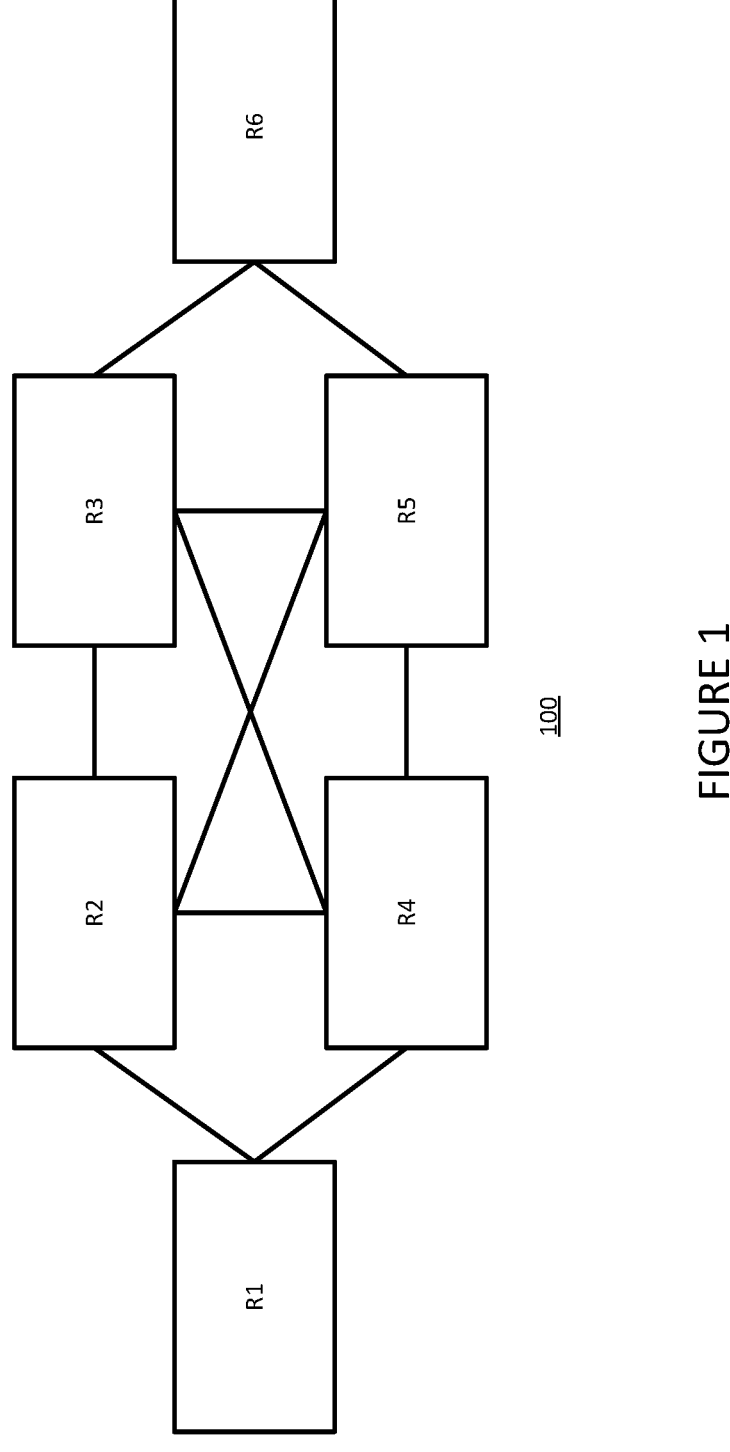
FIG. 1 depicts an example communications network topology used to illustrate challenges when providing fast, local protection of LSP tunnels under RSVP.
Figure 2:
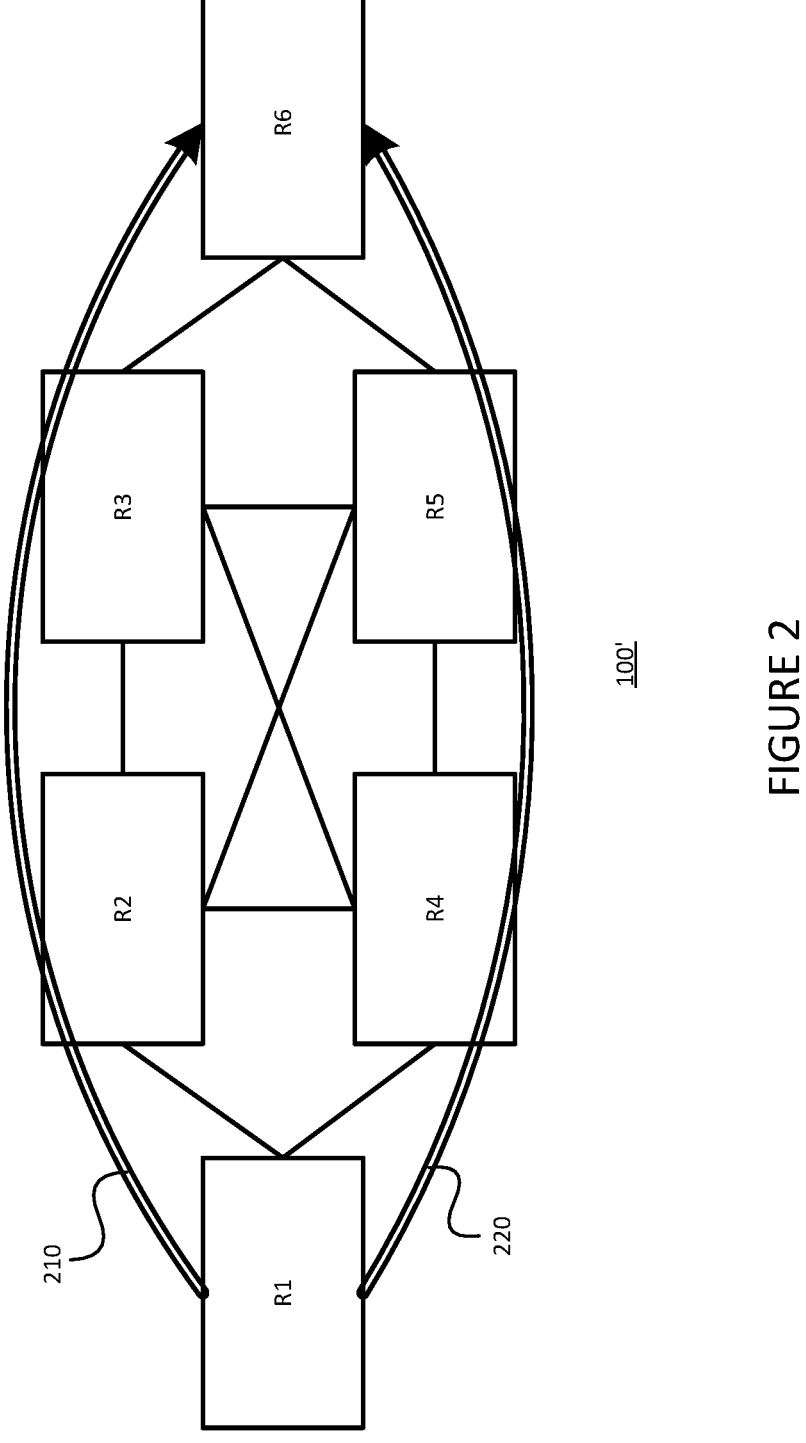
FIG. 2 illustrates the example communications network topology of FIG. 1, configured with primary and secondary paths.
Figure 3A:
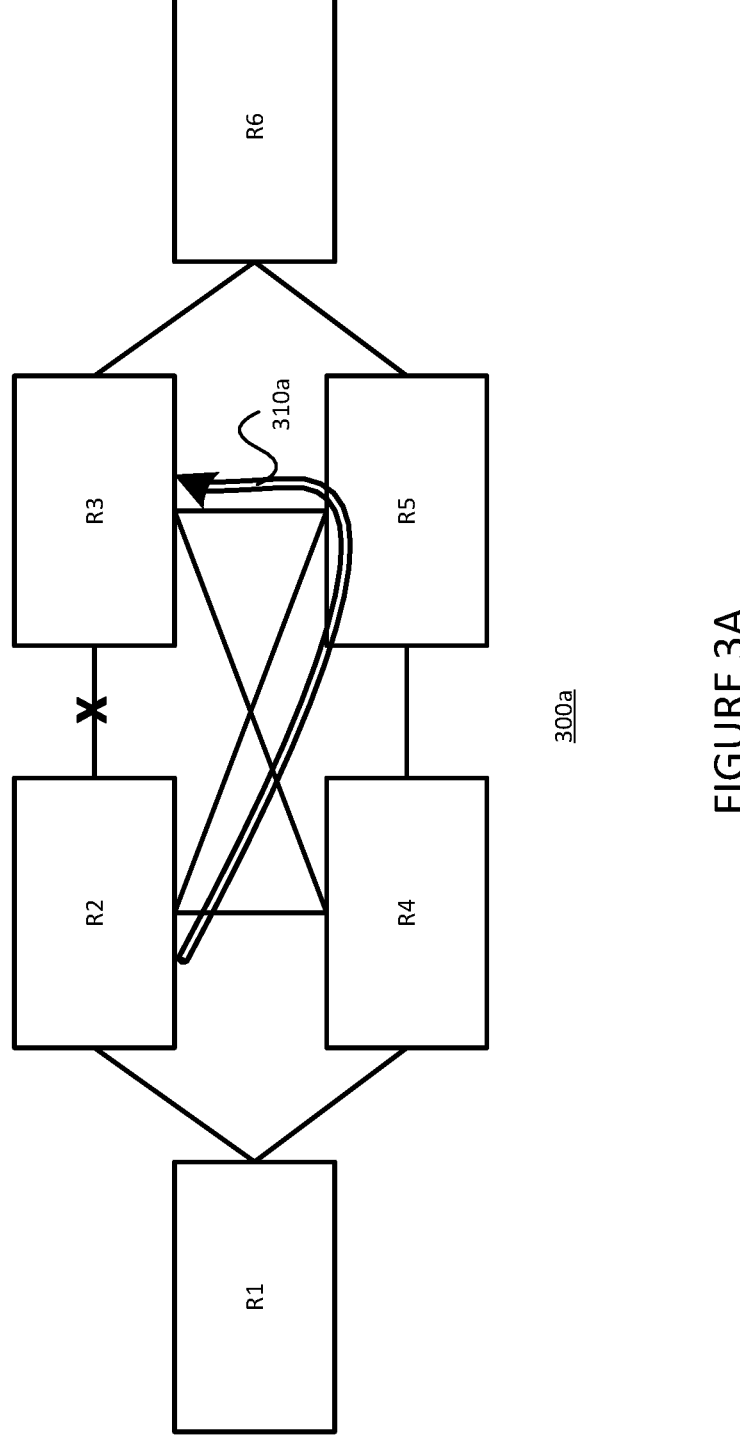
FIGS. 3A-3D illustrate various detour LSPs in the example communications network topology of FIGS. 1 and 2.
Figure 3B:
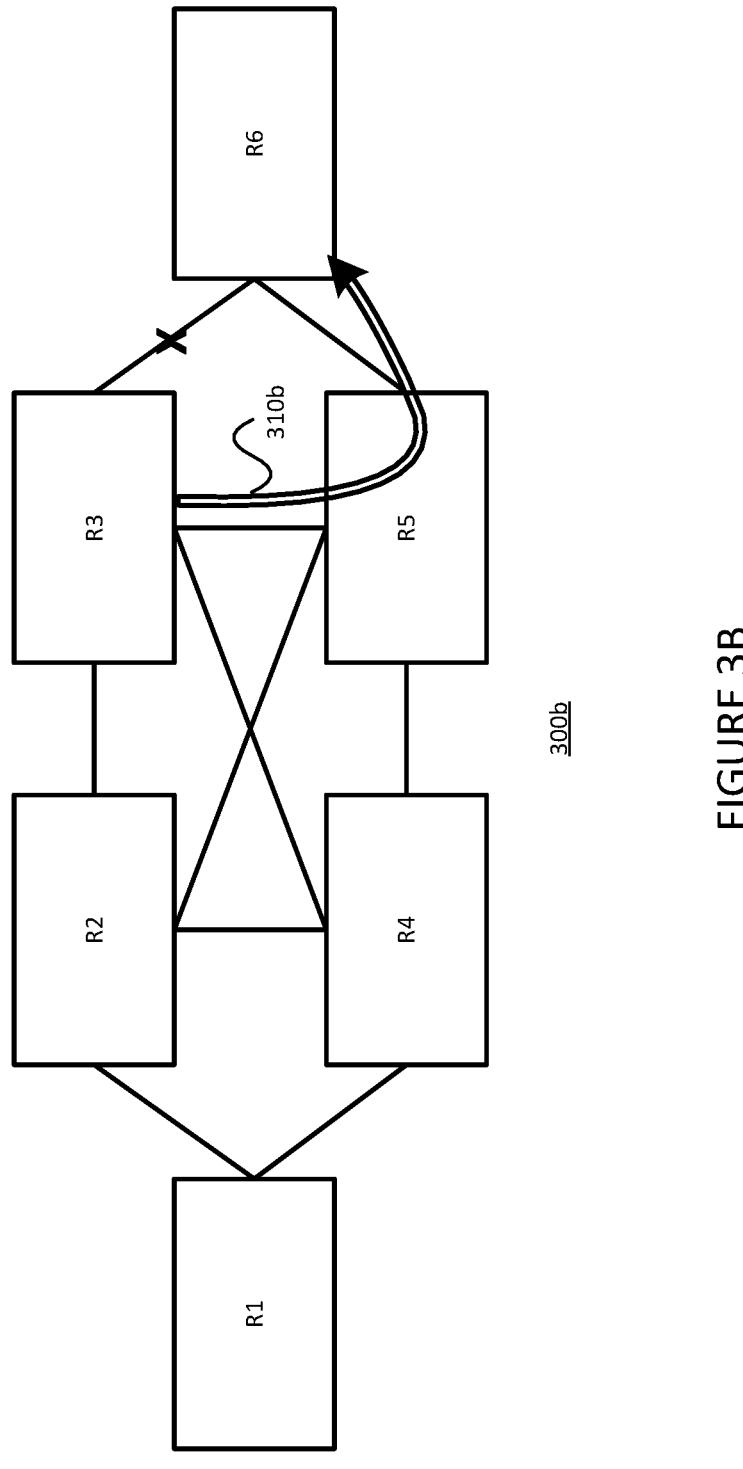
Figure 3C:
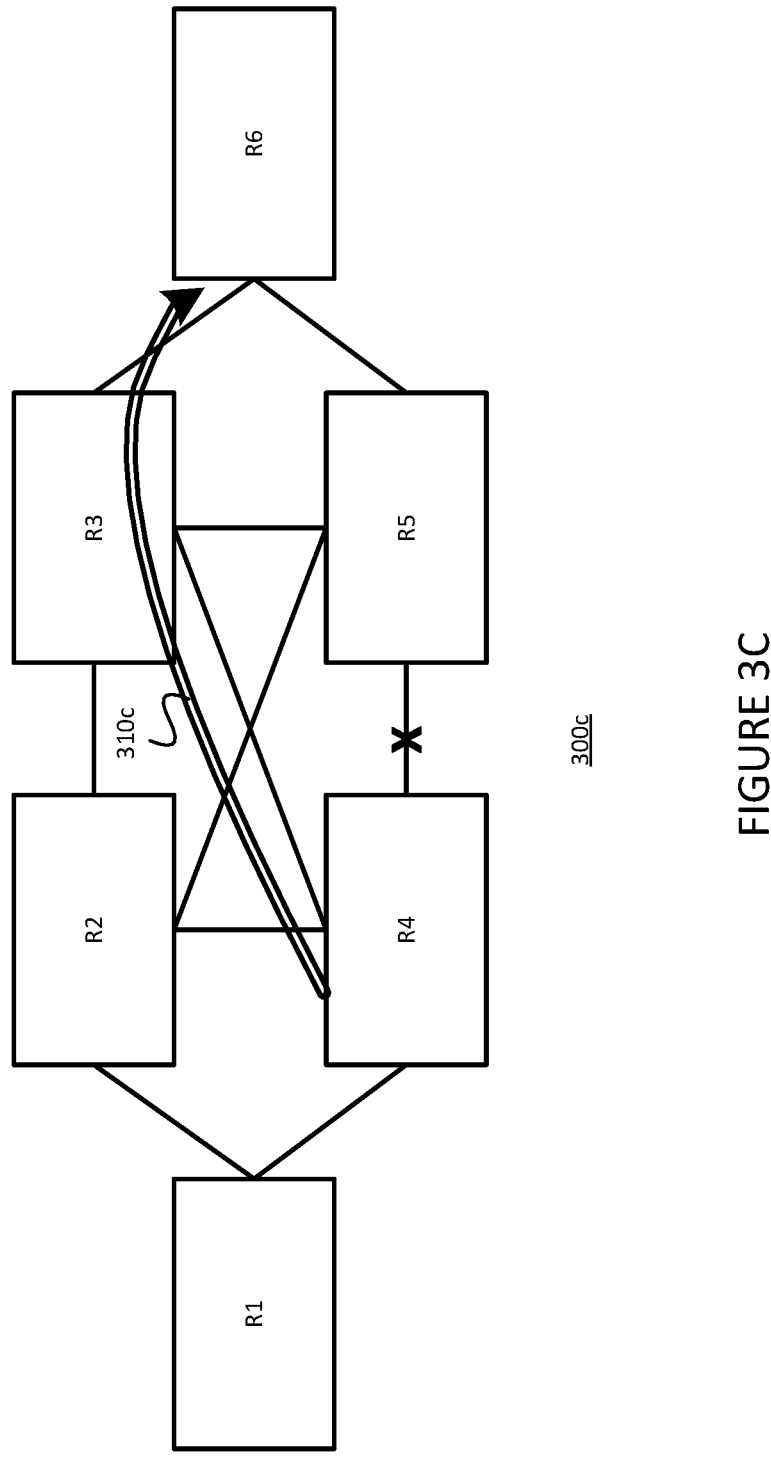
Figure 3D:
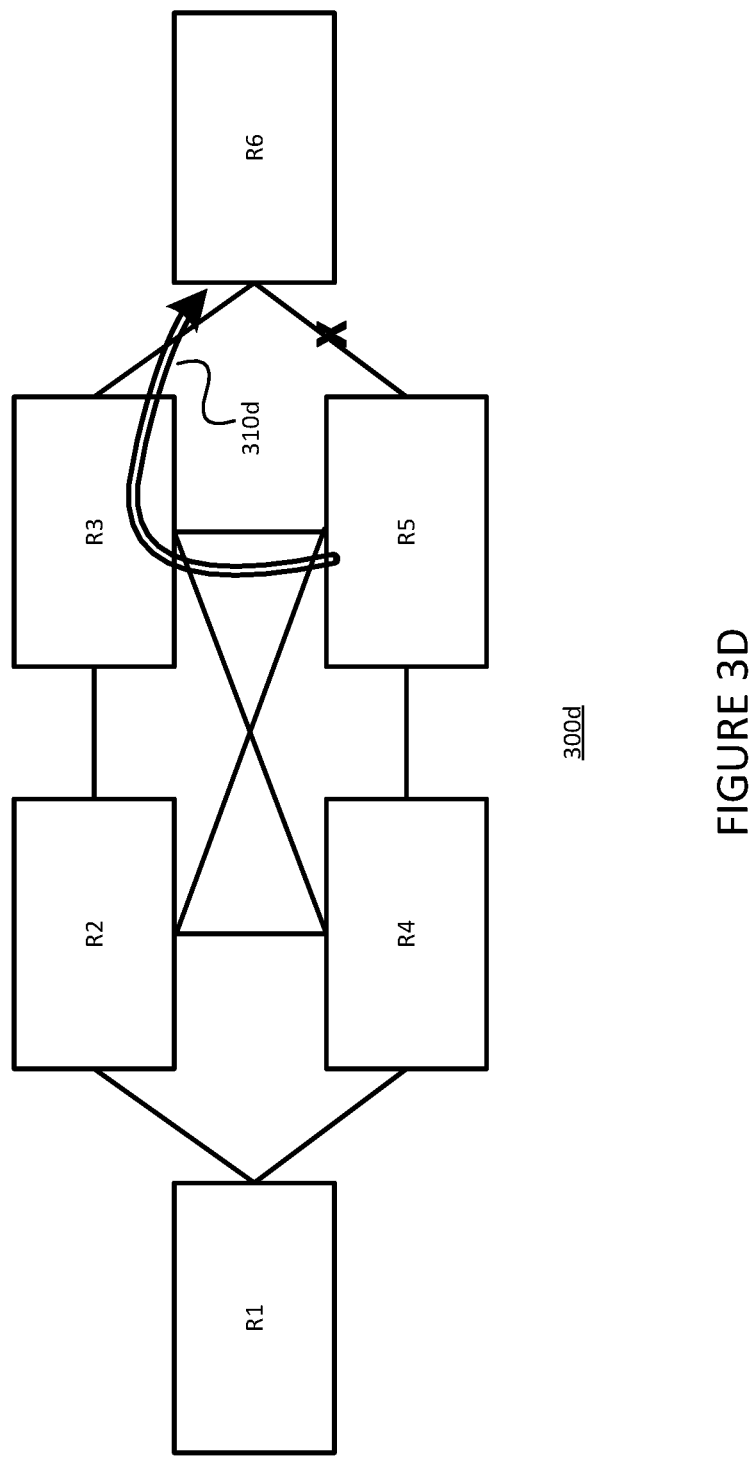

The present disclosure may involve novel methods, apparatus, message formats, and/or data structures for configuring and using detour paths to enable fast failover, while avoiding reserving bandwidth (e.g., on links unused by primary and secondary paths) unnecessarily. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 5.1 Definitions and Acronyms

LSR: Label-Switch Router.

LSP: An (e.g., explicitly routed) MPLS Label-Switched Path. It is the path created by the concatenation of one or more label switched hops, allowing a packet to be forwarded by swapping labels from an MPLS node (e.g., LSR) to another MPLS node (e.g., LSR).

LSP Tunnel: An LSP which is used to tunnel below normal Internet protocol ("IP") routing and/or filtering mechanisms.

Traffic Engineered Tunnel ("TE" Tunnel): A set of one or more LSP Tunnels which carries a traffic trunk.

Traffic Trunk: A set of flows aggregated by their service class and then placed on an LSP or set of LSPs called a traffic engineered tunnel.

Explicitly Routed LSP: An LSP whose path is established by a means other than normal IP routing.

Local Repair: Techniques used to repair LSP tunnels quickly when a node or link along the LSP's path fails.

Point of Local Repair (PLR): The head-end LSR of a backup tunnel or a detour LSP.

One-to-One Backup: A local repair method in which a backup LSP is separately created for each protected LSP at a PLR.

Facility Backup: A local repair method in which a bypass tunnel is used to protect one or more protected LSPs that traverse the PLR, the resource being protected, and the Merge Point in that order.

Protected LSP: An LSP is said to be protected at a given hop if it has one or multiple associated backup tunnels originating at that hop.

Detour LSP: The LSP that is used to re-route traffic around a failure in one-to-one backup.

Bypass Tunnel: An LSP that is used to protect a set of LSPs passing over a common facility.

Backup Tunnel: The LSP that is used to backup up one of the many LSPs in many-to-one backup.

Backup Path: The LSP that is responsible for backing up one protected LSP. A backup path refers to either a detour LSP or a backup tunnel.

Merge Point ("MP"): The LSR where one or more backup tunnels rejoin the path of the protected LSP downstream of the potential failure. The same LSR may be both an MP and a PLR simultaneously.

Detour Merge Point ("DMP"): In the case of one-to-one backup, this is an LSR where multiple detours converge and share the same next-hop. Only one detour is signaled beyond that LSR.

Reroutable LSP: Any LSP for which the head-end LSR requests local protection.

CSPF: Constraint-based Shortest Path First.

SRLG: Shared Risk Link Group.

SRLG Disjoint: A path is considered to be SRLG disjoint from a given link or node if the path does not use any links or nodes which belong to the same SRLG as that given link or node.

§ 5.2 Overview

Example methods consistent with the present description permit configuring and/or using detour paths to enable fast failover, while avoiding reserving bandwidth (e.g., on links unused by primary and secondary paths) unnecessarily. To avoid consuming bandwidth on links unused by primary and secondary paths, example methods consistent with the present description allow the transit routers (e.g., as a point of local failure) to "U-Turn" the traffic towards the head-end node, which can then use the same path used by the primary and/or secondary LSP.

Achieving the above desired behavior may be accomplished as follows. First, the head-end node (e.g., R1) should know to use the secondary LSP's path 220 for its detour. This is a software implementation change. For example, the head-end node may be provided with a "knob" in its LSP configuration that says, "Use U-Turn detours." In a preferred implementation, this option is valid only if: (1) the LSP is configured to use detours; and (2) the LSP has at least one secondary path configured in hot standby mode. Second, the head-end node (e.g., R1) should communicate two pieces of information to the transit routers: (1) whether a "U-Turn" LSP is available in the head-end or not; and (2) whether the head-end would like transit routers to perform U-Turn when computing detours. This may involve both protocol and software changes.

In one example implementation, a new object along the lines of FAST_REROUTE object (See section 4.1 of RFC 4090.) is introduced. This new object will contain two more flags: (1) U-Turn detour desired; and (2) U-Turn detour available. The U-Turn desired flag is turned on by the head-end node if its configuration says, "Use U-Turn detours." The U-Turn detour available flag is turned on by the head-end node if a secondary standby is active (e.g., in hot standby). This new object should have "pass-through" semantics so that routers that do not recognize this new object will forward it without any modification.

Second, the transit nodes (Recall, e.g., R2 and R3) should recognize the extensions above. If the head-end node desires U-Turn and has a U-Turn LSP available, then the transmit nodes use the reverse path through the head-end (retrievable from the RRO contained in the PATH message), but leave the last hop "loose" so head-end node can merge it with the path traversed by the other LSP. If, on the other hand, the head-end node desires U-Turn, but does not have a U-Turn LSP available, then the transit node should consult the local policy to make one of the following two decisions: (A) do not create any detours until the head-end makes a U-Turn LSP available (the default behavior); or (B) compute a detour that does not require U-Turn semantics (This is optionally configured in the transit router.)

Third, when the head-end node receives the PATH message of the detour computed through it, it should merge it with the detour that shares the path with the secondary path 220. This behavior should automatically happen under existing protocols. However, the head-end node's detour path computation logic may be enhanced to re-use paths of other LSPs in the same tunnel.

§ 5.3 Example Method(s)

Figures 4A, 4B:
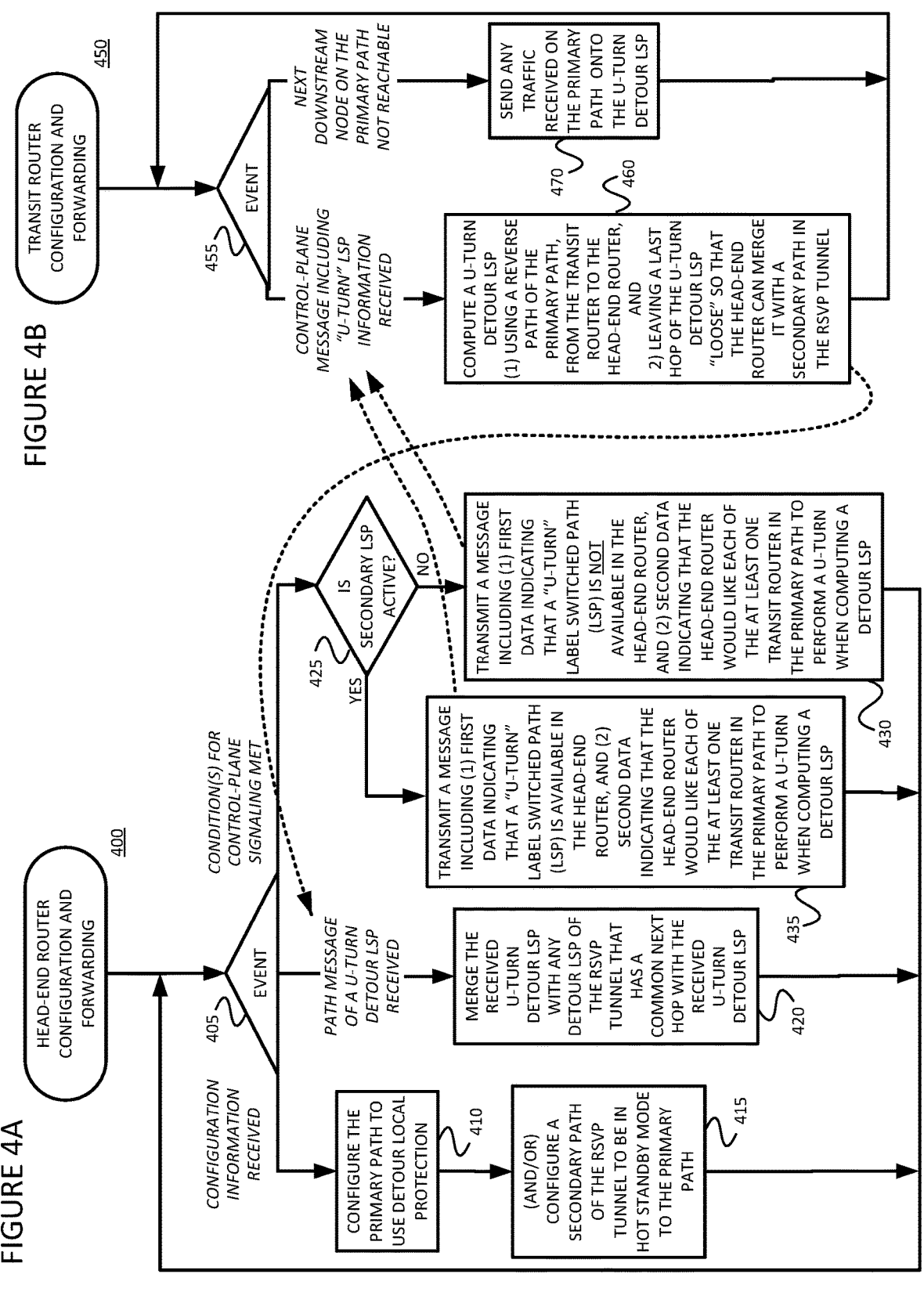
FIGS. 4A and 4B are flow diagrams of example methods for performing configuration and forwarding operations in head-end and transit routers, respectively.
Figure 5A:
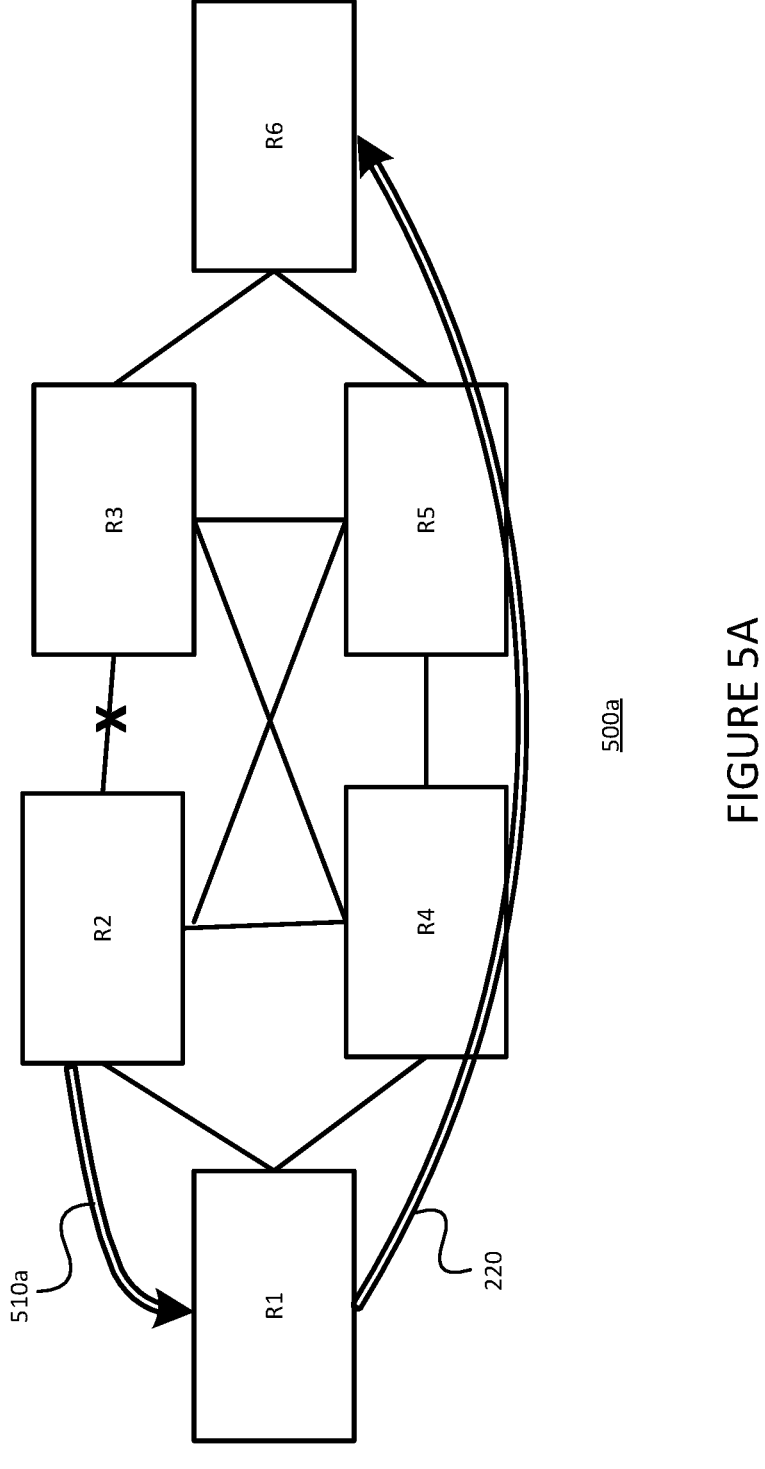
FIGS. 5A-5D illustrate alternative detour LSPs determined using example methods consistent with the present description, in comparison with the detour LSPs depicted in FIGS. 3A-3D.
Figure 5B:
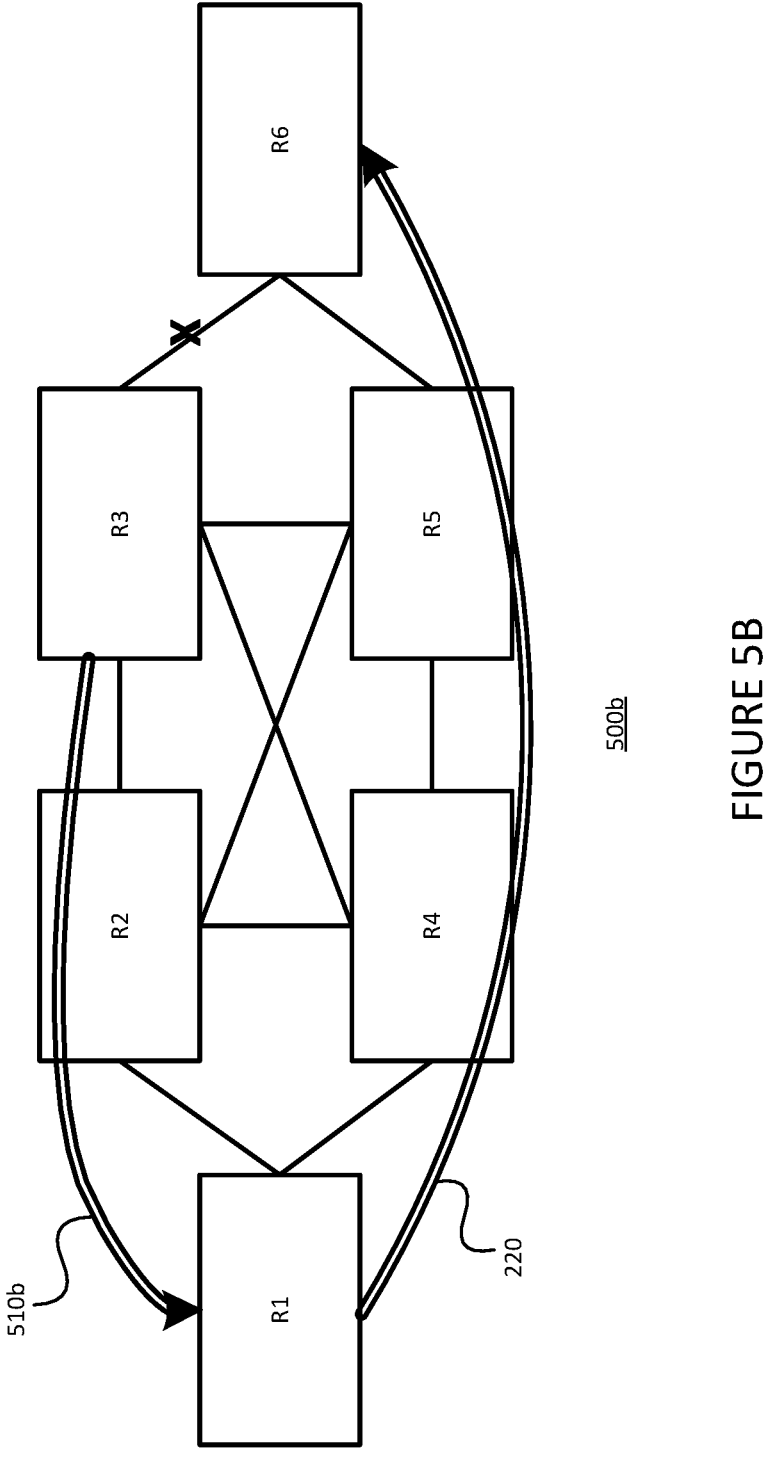
Figure 5C:
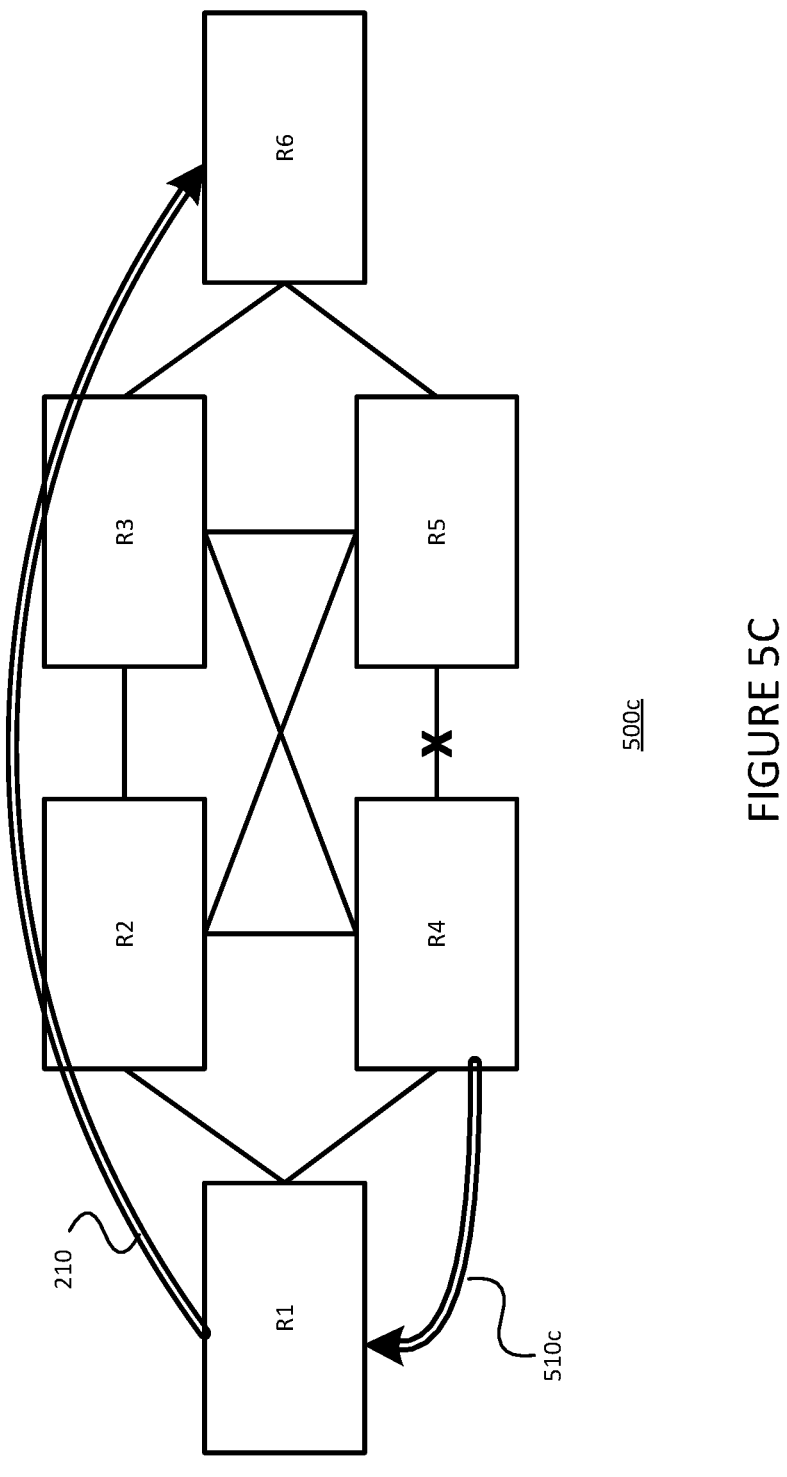
Figure 5D:
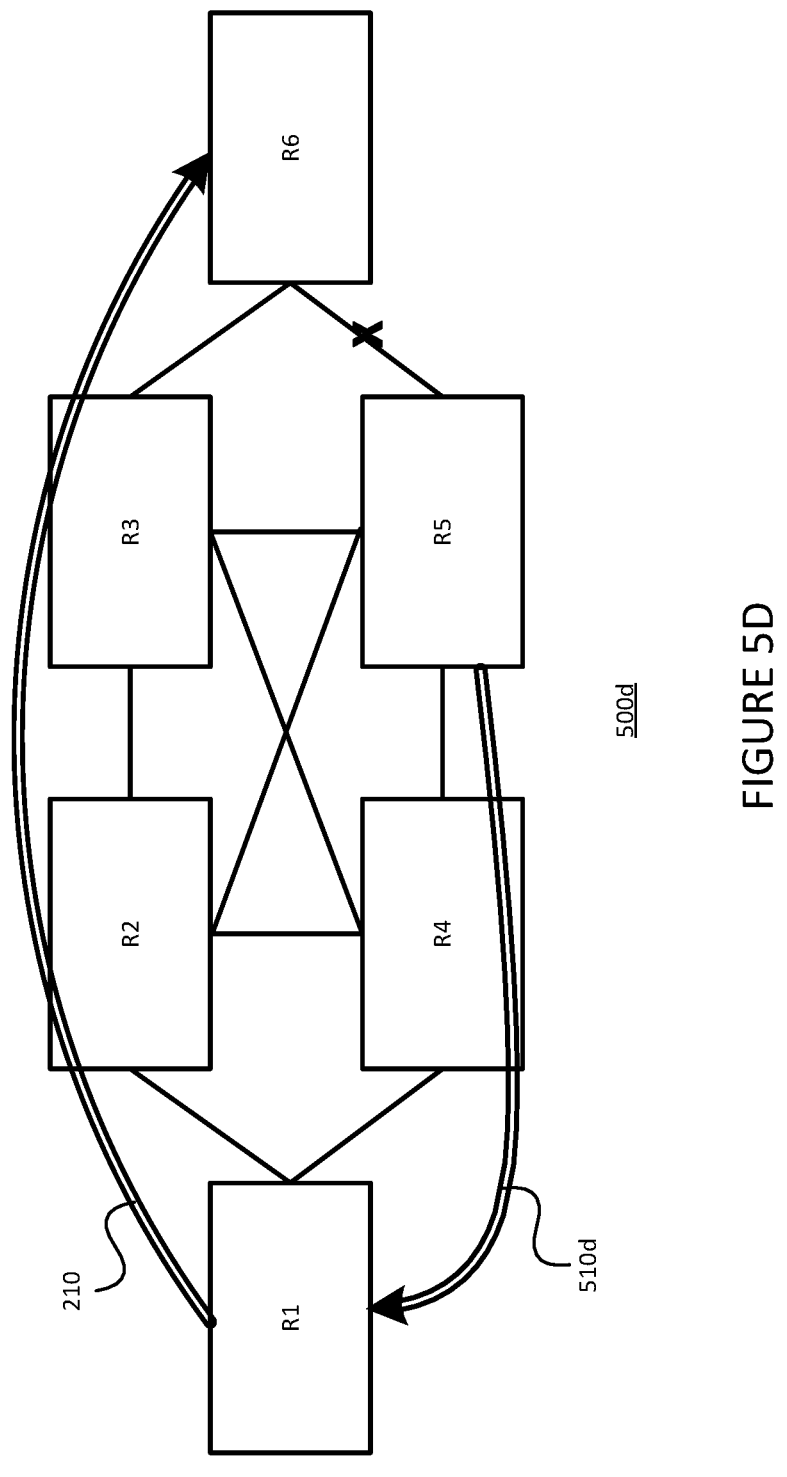

FIGS. 4A and 4B are flow diagrams of example methods 400 and 450 for performing configuration and forwarding operations in head-end and transit routers, respectively. Referring first to example method 400 of FIG. 4A, different branches of the example method 400 are performed in response to the occurrence of different events. (Event branch point 405) Referring first to the left-most branch of FIG. 4A, responsive to receiving configuration information (for a primary and/or secondary path), the example method 400 configures the primary path to use detour local protect (Block 410) and/or configures the secondary path of the RSVP tunnel to be in hot standby mode to the primary path (Block 415). Note that the acts in blocks 410 and 415 need not be performed responsive to the same condition. That is, block 410 may be performed responsive to one condition (e.g., the receipt of primary path configuration information) and block 415 may be performed responsive to a different condition (e.g., the receipt of secondary path configuration information). The example method 400 then branches back to event branch point 405.

Referring next to the right-most branch of FIG. 4A, responsive to condition(s) for control plane signaling are met, the example method 400) may generate a message. However, the content of the message will depend on which or not a secondary LSP is active (e.g., in hot standby). Therefore, the example method 300 determines whether or not a secondary LSP is active. (Decision 425). If, on the one hand, a secondary LSP is not active (Decision 425=NO), the example method 300 transmits a message including (1) first data indicating that a "U-Turn" label switched path (LSP) is not available in the head-end router, and (2) second data indicating that the head-end router would like each of the at least one transit router in the primary path to perform a U-Turn when computing a detour LSP such that the detour LSP may only include routers on the primary path between the transit router and the head-end router, for receipt by each of the at least one transit nodes in the primary path. (Block 430) If, on the other hand, a secondary LSP is active (Decision 425=YES), the example method 300 transmits a message including (1) first data indicating that a "U-Turn" label switched path (LSP) is available in the head-end router, and (2) second data indicating that the head-end router would like each of the at least one transit router in the primary path to perform a U-Turn when computing a detour LSP such that the detour LSP may only include routers on the primary path between the transit router and the head-end router, for receipt by each of the at least one transit nodes in the primary path. (Block 435) Note that the messages in blocks 430 and 435 can be provided in separate RSVP path message. In the typical situation, the first time the message is sent, it may be the case that U-Turn LSP is not yet available. At a later time, after the secondary path is set up and active, the message may indicate that the T-Turn LSP is available. The example method 400 then branches back to event branch point 405.

Referring next to example method 450 of FIG. 4B, different branches of the example method 450 are performed responsive to the occurrence of different events. (Event branch point 455) Referring first to the left branch of FIG. 4B, responsive to receiving a control-plane message (or messages) including U-Turn LSP information (Recall, e.g., block 430 and/or block 435.), the example method 450 computes a U-Turn detour LSP (1) using a reverse path of the primary path, from the transit router to the head-end router, and (2) leaving a last hop of the U-Turn detour LSP "loose" so that the head end router can merge it with a secondary path in the RSVP tunnel. (Block 460) Alternatively, the example method 450 may compute the U-Turn detour LSP upon receipt of the message from block 430, and later employ the U-Turn detour LSP (after receipt of the message from block 435). The example method 450 then branches back to event branch point 455.

Referring back to FIG. 4A, the middle branch of the example method 400 is performed responsive to receiving a path message of a U-Turn detour LSP (e.g., from transit node. Recall block 460). More specifically, the example method 400 merges the received U-Turn detour LSP of the RSVP tunnel that has a common next hop with the received U-Turn detour LSP. (Block 420) The example method 400 then branches back to event branch point 405.

At this time, the configuration of the head-end node (router) and the transit node(s) (router(s)) is complete. In the following, it is assumed that the transmit node detects that the next downstream node on the primary path is not reachable (e.g., due to the next downstream node being down, and/or due to the communications link to the next downstream node being down, etc.). Responsive to such a detection, the example method 450 sends any traffic received on the primary path onto the (previously computed) U-Turn detour LSP. (Block 470) The example method 450 then branches back to event branch point 455. Upon receipt, the head-end node will place such traffic on the secondary LSP.

Referring back to the left-most branch of FIG. 4A, configuration information may be received, for example, via a user interface, via a locally inserted storage device, and/or via a remote terminal.

Referring back to the right-most branch of FIG. 4A, condition(s) for control plane signaling may be, for example, any condition(s) that trigger RSVP path messages.

Referring back to block 415 of FIG. 4A, in some example methods 400, the bandwidth reserved on the secondary path corresponds to bandwidth reserved on the primary path.

Referring back to blocks 430 and 434 of FIG. 4A, the information may be expressed in the message(s) by setting flags of a FAST_REROUTE object. For example, the first data (indicating that a U-Turn LSP is available in the head-end node) may be a first flag in the FAST-REROUTE object, and the second data (indicating that the head-end node would like each of the transit nodes in the primary path to perform a U-Turn when computing a detour LSP) may be a second flag in the FAST_REROUTE object. That is, the first flag may be used to indicate whether or not the head-end node desires U-Turn detour, and the second flag may be used to indicate whether or not a U-Turn detour is available based on whether or not the secondary path is active. In at least some example methods, the FAST_REROUTE object is provided with "pass-through" semantics so that any nodes (e.g., routers) that do not recognize the FAST_REROUTE object will forward it without any modification. This first option may use, for example, a FAST_REROUTE Object with same C-Type (e.g., Class-Num=205; C-Type=1) The existing definitions of Flags in the FAST-REROUTE object include: 0x01 for One-to-One Backup Desired (i.e., protection via the one-to-one backup method is requested); and 0x02 for Facility Backup Desired (i.e., protection via the facility backup method is requested). Further, two new definitions of Flags may be introduced. These two new flags may be, for example: 0x03 for U-turn One-to-One Backup Desired (i.e., protection via the one-to-one backup method where the one-to-one backup should merge with the backup on the head-end LSR is requested); and 0x04 for U-turn One-to-One Backup Available (which signals the availability of one-to-one backup on the head-end LSR that all U-turn backups from transit LSRs may merge with).

Alternatively, a single flag or bit may be used to indicate that a U-Turn detour is desired only when a secondary LSP is active. In this alternative, the single flag or bit indicating the desire for a U-Turn detour implies that the secondary LSP is active.

As another alternative, the FAST_REROUTE Object may be provided with new C-Type (e.g., Class-Num=205; C-Type=2) Except for the two new flags, all other contents of C-type 2 are the same as the example FAST_REROUTE object with C-Type 1, described above.

As yet another option, the information may be transmitted in a new LSP-ATTRIBUTES TLV called U-turn Backup. For example, an LSP-ATTRIBUTES TLV defined in the document, Farrel, et al., "Attributes for MPLS LSPs Using RSVP-TE," *Request for Comments:* 5420 (Internet Engineering Task Force, February 2009) (referred to as "RFC 5420" and incorporated herein by reference) may be used. Under RFC 5420, the format of a U-turn Backup Attributes TLV the format of the U-turn Backup Attributes TLV (Attribute TLV Type is TBA (to be assigned by IANA) may include 30 reserved bits, followed by an A-flag and a U-flag. In this alternative, the presence of a U-turn Backup Attributes TLV in the LSP_ATTRIBUTES object in an RSVP Path message indicates that all nodes supporting this TLV must process it as per the rules described below if the Path message also contains a FAST_REROUTE object and the processing node is about to follow the procedures of RFC 4090 to make one-to-one backup available for the LSP. In one example, the U-Flag is 0x01 for U-turn One-to-One Backup Desired (i.e., protection via the one-to-one backup method where the one-to-one backup should merge with the backup on the head-end LSR is requested). In this example, the A-Flag is 0x02 for U-turn One-to-One Backup Available (which signals the availability of one-to-one backup on the head-end LSR that all U-turn backups from transit LSRs may merge with). The 30-bit reserved field is for future specification. It should be set to zero on transmission and will be ignored on receipt to ensure future compatibility.

Referring back to block 420 of FIG. 4A, in some example methods 400, detour path computation logic of the head-end router is configured to re-use paths of other LSPs in the same RSVP tunnel.

Referring back to block 460 of FIG. 4B, in some example methods 450, the reverse path of the primary path, from the transit router to the head-end router is retrieved from a Record Route Object (RRO).

§ 5.4 Example of Operations of an Example Method

FIGS. 5A-5D illustrate U-Turn detour LSPs determined using example methods consistent with the present description, in comparison with the detour LSPs depicted in FIGS. 3A-3D. For example, in FIG. 5A, when R2 determines that R3 is not reachable (due to the link between them being down), it uses a U-Turn detour LSP 510*a* back to node R1, which then merges it with secondary path 220. Compare this with the example in FIG. 3A, which has to reserve bandwidth on links between nodes R2 and R5, and nodes R5 and R3 for detour LSP 310*a*. As another example, in FIG. 5B, when R3 determines that R6 is not reachable (due to the link between them being down), it uses a U-Turn detour LSP 510*b* back to node R1, which then merges it with secondary path 220. Compare this with the example in FIG. 3B, which has to reserve bandwidth on the link between nodes R3 and R5 (and the link between nodes R5 and R6, which is also reserved in FIG. 5B) for detour LSP 310*b*.

An equivalent U-Turn detour LSP may be configured for the secondary path. For example, in FIG. 5C, when R4 determines that R5 is not reachable (due to the link between them being down), it uses a U-Turn detour LSP 510*c* back to node R1, which then merges it with primary path 210. Compare this with the example in FIG. 3C, which has to reserve bandwidth on links between nodes R4 and R3 (and the link between nodes R3 and R6, which is also reserved in FIG. 5C) for detour LSP 310*c*. Finally, in FIG. 5D, when R5 determines that R6 is not reachable (due to the link between them being down), it uses a U-Turn detour LSP 510*d* back to node R1, which then merges it with primary path 210. Compare this with the example in FIG. 3D, which has to reserve bandwidth on links between nodes R5 and R3 (and the link between nodes R3 and R6, which is also reserved in FIG. 5D) for detour LSP 310*d*.

In the examples illustrated in FIGS. 5A-5D, the default behavior of U-turn detours is to merge. Thus, if the U-Turn detour of node R3 returns to node R2, and the U-Turn detour of node R2 returns to node R1, these detours would all get merged to the detour from node R1 to node R6. Note that the example method of always using only U-Turn detours will limit the number of detour reservations to only the reverse TE links along the path of the primary and the secondary LSPs. As should be appreciated from the foregoing examples illustrated in FIGS. 5A-5D, example methods consistent with the present description use detour paths to enable fast failover, while avoiding reserving bandwidth (e.g., on links unused by primary and secondary paths) unnecessarily.

§ 5.5 Example Apparatus

Figure 6:
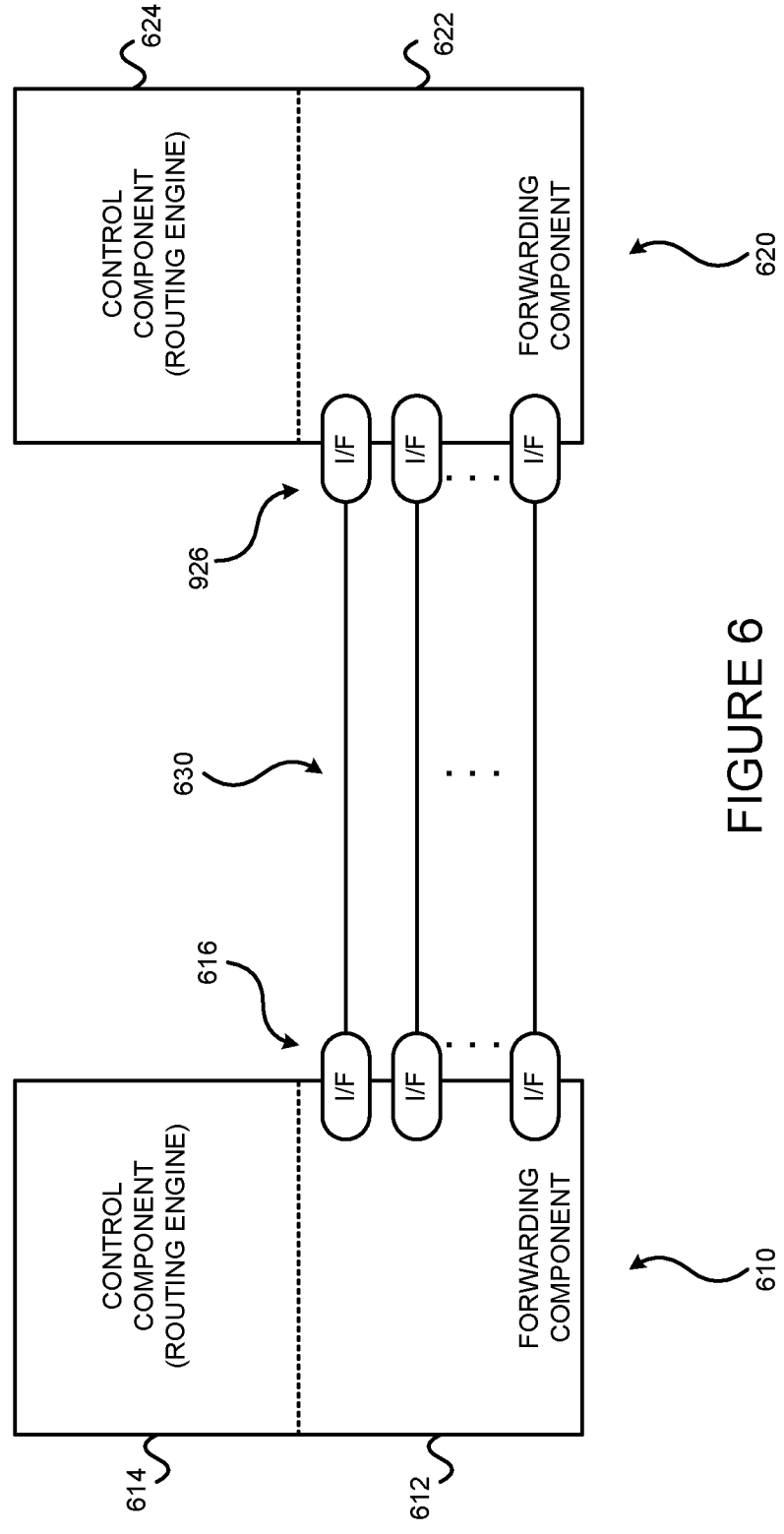
FIG. 6 illustrates two data forwarding systems, which may be used as nodes, coupled via communications links, in a communications network, such as communications network employing U-Turn detour LSPs.

The data communications network nodes may be forwarding devices, such as routers for example. FIG. 6 illustrates two data forwarding systems 610 and 620 coupled via communications links 630. The links may be physical links or "wireless" links. The data forwarding systems 610,620 may be routers for example. If the data forwarding systems 610,620 are example routers, each may include a control component (e.g., a routing engine) 614,624 and a forwarding component 612,622. Each data forwarding system 610,620 includes one or more interfaces 616,626 that terminate one or more communications links 630.

As just discussed above, and referring to FIG. 7, some example routers 700 include a control component (e.g., routing engine) 710 and a packet forwarding component (e.g., a packet forwarding engine) 790.

The control component 710 may include an operating system (OS) kernel 720, routing protocol process(es) 730, label-based forwarding protocol process(es) 740, interface process(es) 750, user interface (e.g., command line interface) process(es) 760, and chassis process(es) 770, and may store routing table(s) 739, label forwarding information 745, and forwarding (e.g., route-based and/or label-based) table (s) 780. As shown, the routing protocol process(es) 730 may support routing protocols such as the routing information protocol ("RIP") 731, the intermediate system-to-intermediate system protocol ("IS-IS") 732, the open shortest path first protocol ("OSPF") 733, the enhanced interior gateway routing protocol ("EIGRP") 734 and the border gateway protocol ("BGP") 735, and the label-based forwarding protocol process(es) 740 may support protocols such as BGP 735, the label distribution protocol ("LDP") 736, the resource reservation protocol ("RSVP") and extensions thereto 737, Ethernet virtual private network ("EVPN") 738 and layer 2 virtual private network ("L2VPN") 739. One or more components (not shown) may permit a user 765 to interact with the user interface process(es) 760. Similarly, one or more components (not shown) may permit an outside device to interact with one or more of the router protocol process(es) 730, the label-based forwarding protocol process (es) 740, the interface process(es) 750, and the chassis process(es) 770, via SNMP 785, and such processes may send information to an outside device via SNMP 785.

The packet forwarding component 790 may include a microkernel 792 over hardware components (e.g., ASICs, switch fabric, optics, etc.) 791, interface process(es) 793, ASIC drivers 794, chassis process(es) 795 and forwarding (e.g., route-based and/or label-based) table(s) 796.

Figure 7:
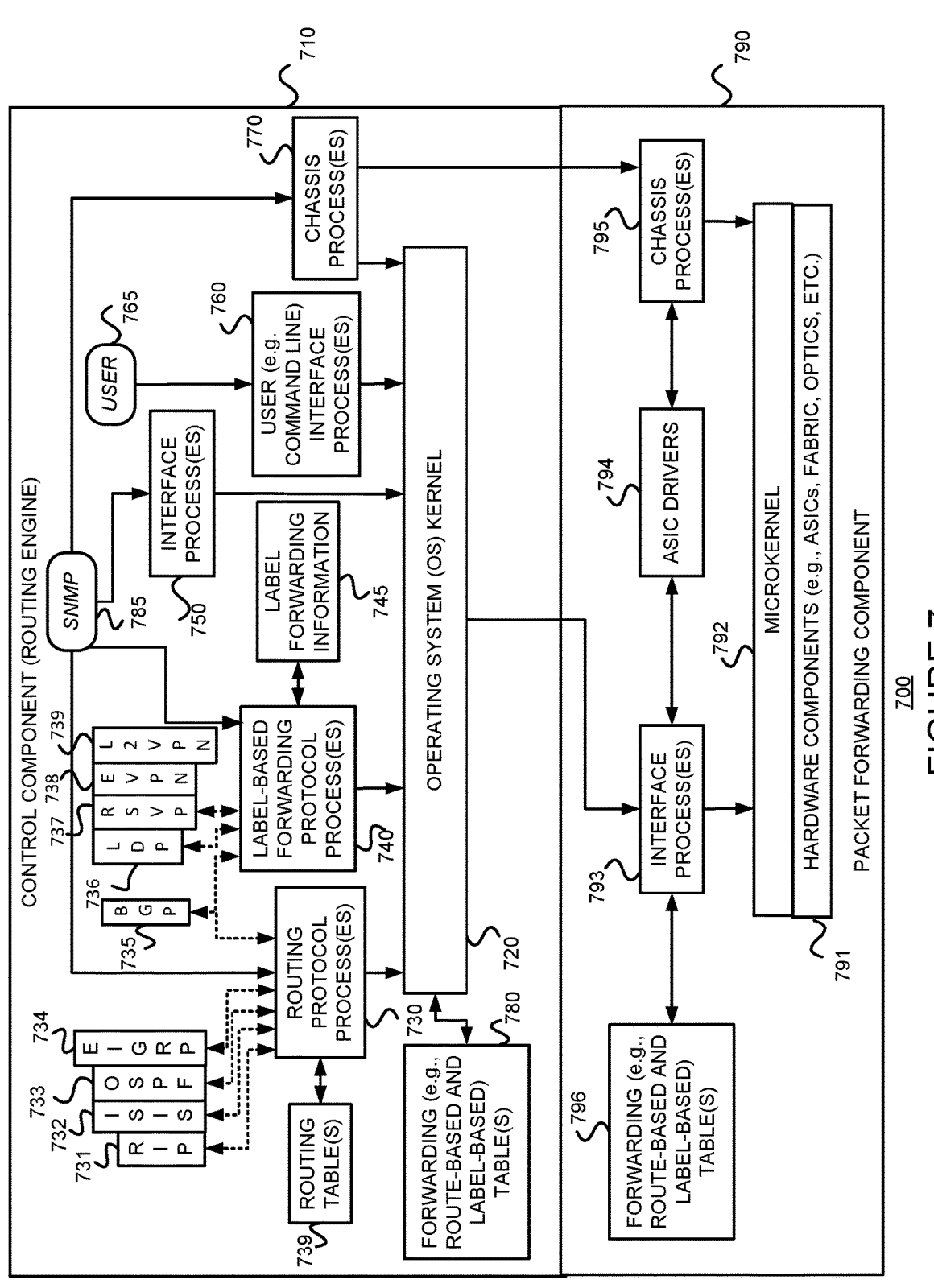
FIG. 7 is a block diagram of a router which may be used a communications network, such as communications network employing U-Turn detour LSPs.

In the example router 700 of FIG. 7, the control component 710 handles tasks such as performing routing protocols, performing label-based forwarding protocols, control packet processing, etc., which frees the packet forwarding component 790 to forward received packets quickly. That is, received control packets (e.g., routing protocol packets and/or label-based forwarding protocol packets) are not fully processed on the packet forwarding component 790 itself, but are passed to the control component 710, thereby reducing the amount of work that the packet forwarding component 790 has to do and freeing it to process packets to be forwarded efficiently. Thus, the control component 710 is primarily responsible for running routing protocols and/or label-based forwarding protocols, maintaining the routing tables and/or label forwarding information, sending forwarding table updates to the packet forwarding component 790, and performing system management. The example control component 710 may handle routing protocol packets, provide a management interface, provide configuration management, perform accounting, and provide alarms. The processes 730, 740, 750, 760 and 770 may be modular, and may interact with the OS kernel 720. That is, nearly all of the processes communicate directly with the OS kernel 720. Using modular software that cleanly separates processes from each other isolates problems of a given process so that such problems do not impact other processes that may be running. Additionally, using modular software facilitates easier scaling.

Still referring to FIG. 7, the example OS kernel 720 may incorporate an application programming interface ("API") system for external program calls and scripting capabilities. The control component 710 may be based on an Intel PCI platform running the OS from flash memory, with an alternate copy stored on the router's hard disk. The OS kernel 720 is layered on the Intel PCI platform and establishes communication between the Intel PCI platform and processes of the control component 710. The OS kernel 720 also ensures that the forwarding tables 796 in use by the packet forwarding component 790 are in sync with those 780 in the control component 710. Thus, in addition to providing the underlying infrastructure to control component 710 software processes, the OS kernel 720 also provides a link between the control component 710 and the packet forwarding component 790.

Referring to the routing protocol process(es) 730 of FIG. 7, this process(es) 730 provides routing and routing control functions within the platform. In this example, the RIP 731, ISIS 732, OSPF 733 and EIGRP 734 (and BGP 735) protocols are provided. Naturally, other routing protocols may be provided in addition, or alternatively. Similarly, the label-based forwarding protocol process(es) 740 provides label forwarding and label control functions. In this example, the LDP 736, RSVP (and extensions thereto) 737, EVPN 738 and L2VPN 739 (and BGP 735) protocols are provided. Naturally, other label-based forwarding protocols (e.g., MPLS, SR, etc.) may be provided in addition, or alternatively. In the example router 700, the routing table(s) 739 is produced by the routing protocol process(es) 730, while the label forwarding information 745 is produced by the label-based forwarding protocol process(es) 740.

Still referring to FIG. 7, the interface process(es) 750 performs configuration of the physical interfaces and encapsulation.

The example control component 710 may provide several ways to manage the router. For example, it 710 may provide a user interface process(es) 760 which allows a system operator 765 to interact with the system through configuration (Recall, e.g., control knobs discussed above.), modifications, and monitoring. The SNMP 785 allows SNMP-capable systems to communicate with the router platform. This also allows the platform to provide necessary SNMP information to external agents. For example, the SNMP 785 may permit management of the system from a network management station running software, such as Hewlett-Packard's Network Node Manager ("HP-NNM"), through a framework, such as Hewlett-Packard's Open View. Accounting of packets (generally referred to as traffic statistics) may be performed by the control component 710, thereby avoiding slowing traffic forwarding by the packet forwarding component 790.

Although not shown, the example router 700 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 760 via a console port, an auxiliary port, and/or a management Ethernet port.

The packet forwarding component 790 is responsible for properly outputting received packets as quickly as possible. If there is no entry in the forwarding table for a given destination or a given label and the packet forwarding component 790 cannot perform forwarding by itself, it 790 may send the packets bound for that unknown destination off to the control component 710 for processing. The example packet forwarding component 790 is designed to perform Layer 2 and Layer 3 switching, route lookups, and rapid packet forwarding.

As shown in FIG. 7, the example packet forwarding component 790 has an embedded microkernel 792 over hardware components 791, interface process(es) 793, ASIC drivers 794, and chassis process(es) 795, and stores a forwarding (e.g., route-based and/or label-based) table(s) 796. The microkernel 792 interacts with the interface process(es) 793 and the chassis process(es) 795 to monitor and control these functions. The interface process(es) 792 has direct communication with the OS kernel 720 of the control component 710. This communication includes forwarding exception packets and control packets to the control component 710, receiving packets to be forwarded, receiving forwarding table updates, providing information about the health of the packet forwarding component 790 to the control component 710, and permitting configuration of the interfaces from the user interface (e.g., CLI) process(es) 760 of the control component 710. The stored forwarding table (s) 796 is static until a new one is received from the control component 710. The interface process(es) 793 uses the forwarding table(s) 796 to look up next-hop information. The interface process(es) 793 also has direct communication with the distributed ASICs. Finally, the chassis process(es) 795 may communicate directly with the microkernel 792 and with the ASIC drivers 794.

Figure 8:
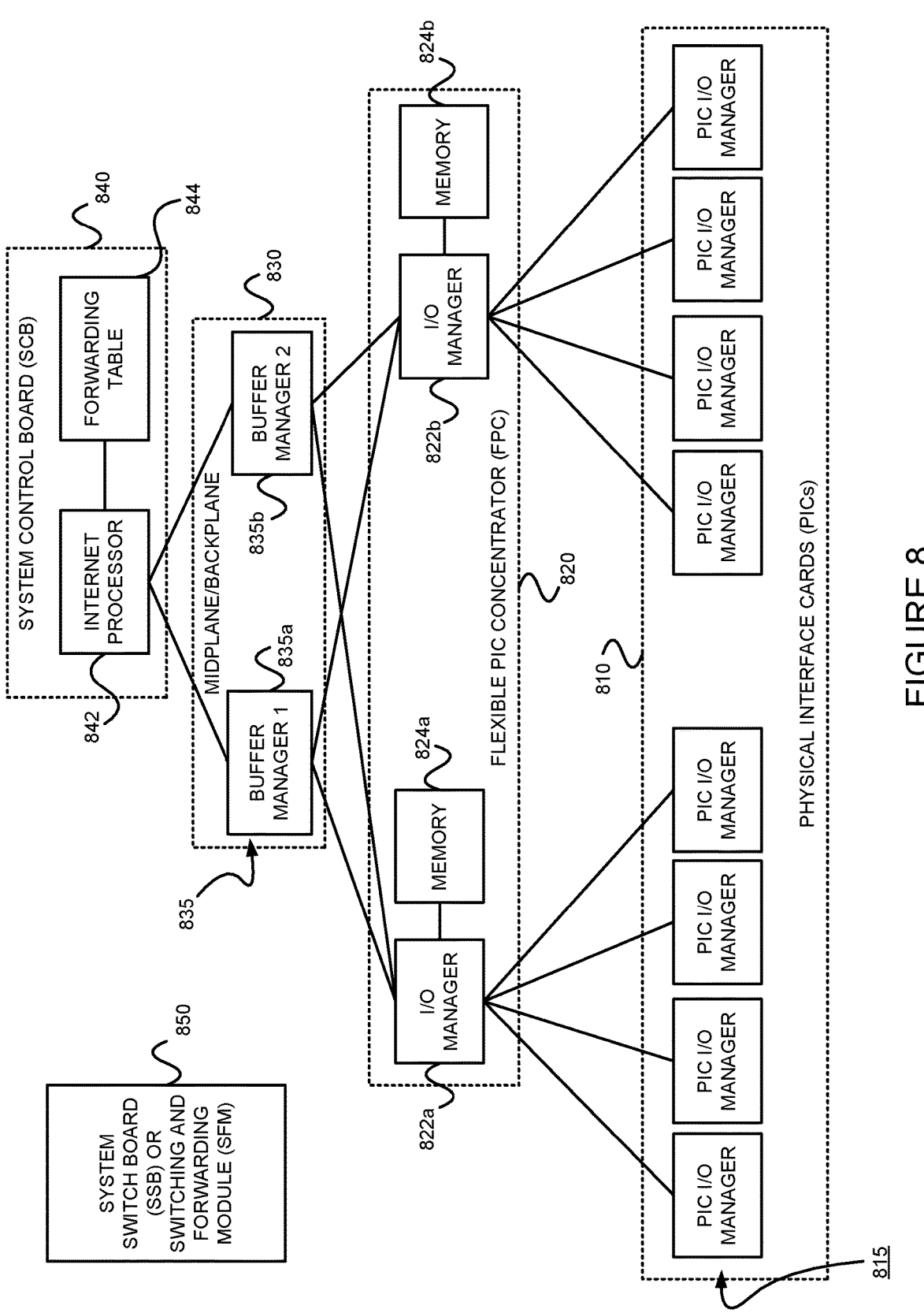
FIG. 8 is an example architecture in which ASICS may be distributed in a packet forwarding component to divide the responsibility of packet forwarding.
Figures 9A, 9B:
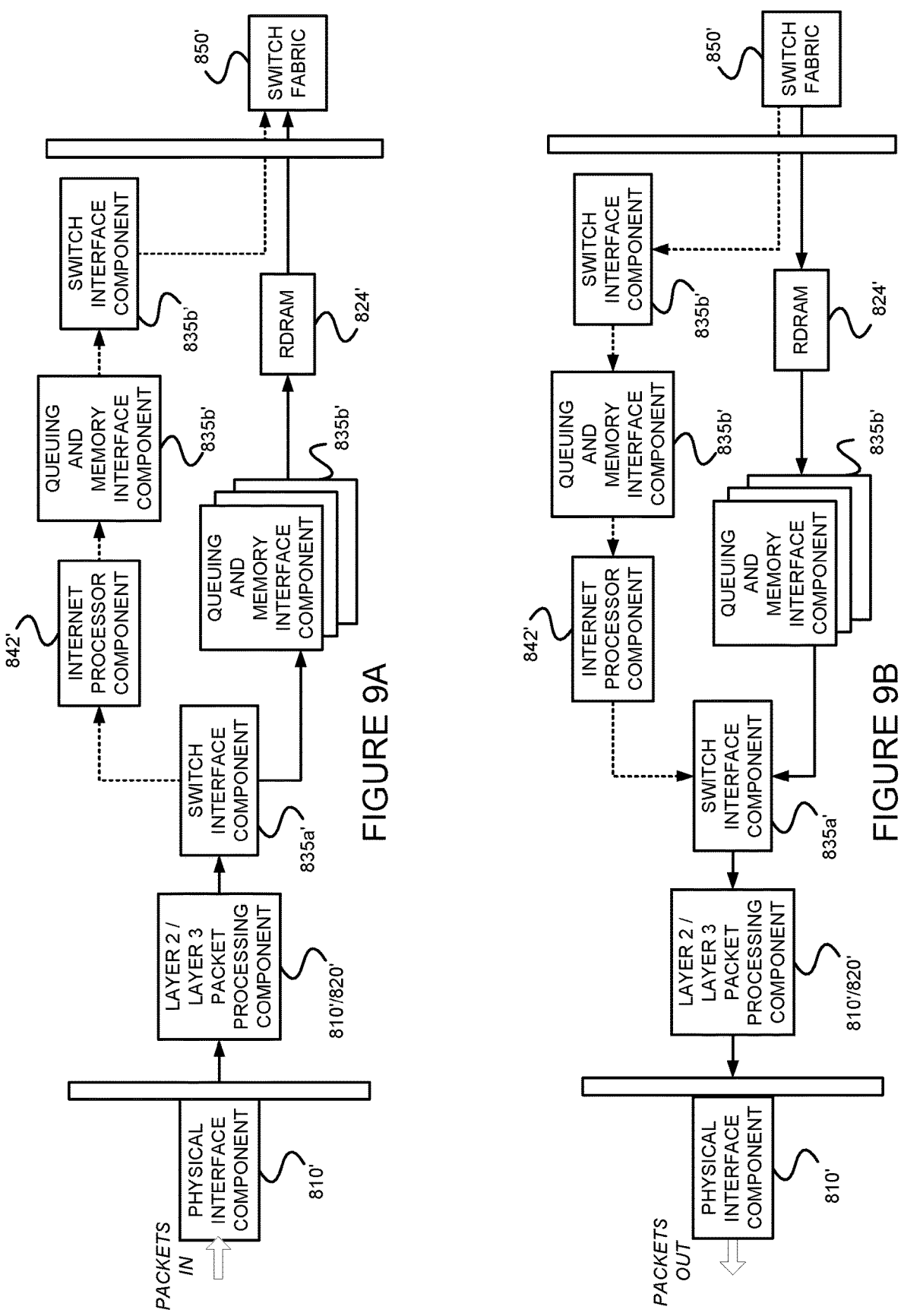
FIGS. 9A and 9B is an example of operations of the example architecture of FIG. 8.

FIG. 8 is an example of how the ASICS may be distributed in the packet forwarding component 790 to divide the responsibility of packet forwarding. As shown in FIG. 8, the ASICs of the packet forwarding component 790 may be distributed on physical interface cards ("PICs") 810, flexible PIC concentrators ("FPCs") 820, a midplane or backplane 830, and a system control board(s) 840 (for switching and/or forwarding). Switching fabric is also shown as a system switch board ("SSB"), or a switching and forwarding module ("SFM") 850 (which may be a switch fabric 850' as shown in FIGS. 9A and 9B). Each of the PICs 810 includes one or more PIC I/O managers 815. Each of the FPCs 820 includes one or more I/O managers 822, each with an associated memory 824 (which may be a RDRAM 824' as shown in FIGS. 9A and 9B). The midplane/backplane 830 includes buffer managers 835a, 835b. Finally, the system control board 840 includes an internet processor 842 and an instance of the forwarding table 844 (Recall, e.g., 796 of FIG. 7).

Still referring to FIG. 8, the PICs 810 contain the interface ports. Each PIC 810 may be plugged into an FPC 820. Each individual PIC 810 may contain an ASIC that handles media-specific functions, such as framing or encapsulation. Some example PICs 810 provide SDH/SONET, ATM, Gigabit Ethernet, Fast Ethernet, and/or DS3/E3 interface ports.

An FPC 820 can contain one or more PICs 810, and may carry the signals from the PICS 810 to the midplane/backplane 830 as shown in FIG. 8.

The midplane/backplane 830 holds the line cards. The line cards may connect into the midplane/backplane 830 when inserted into the example router's chassis from the front. The control component (e.g., routing engine) 710 may plug into the rear of the midplane/backplane 830 from the rear of the chassis. The midplane/backplane 830 may carry electrical (or optical) signals and power to each line card and to the control component 710.

The system control board 840 may perform forwarding lookup. It 840 may also communicate errors to the routing engine. Further, it 840 may also monitor the condition of the router based on information it receives from sensors. If an abnormal condition is detected, the system control board 840 may immediately notify the control component 710.

Referring to FIGS. 8, 9A and 9B, in some exemplary routers, each of the PICs 810,810' contains at least one I/O manager ASIC 815 responsible for media-specific tasks, such as encapsulation. The packets pass through these I/O ASICs on their way into and out of the router. The I/O manager ASIC 815 on the PIC 810,810' is responsible for managing the connection to the I/O manager ASIC 822 on the FPC 820,820', managing link-layer framing and creating the bit stream, performing cyclical redundancy checks (CRCs), and detecting link-layer errors and generating alarms, when appropriate. The FPC 820 includes another I/O manager ASIC 822. This ASIC 822 (shown as a layer 2/layer 3 packet processing component 810'/820') takes the packets from the PICs 810 and breaks them into (e.g., 74-byte) memory blocks. This FPC I/O manager ASIC 822 (shown as a layer 2/layer 3 packet processing component 810'/820') sends the blocks to a first distributed buffer manager (DBM) 835a (shown as switch interface component 835a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 835/835a' manages and writes packets to the shared memory 824 across all FPCs 820. In parallel, the first DBM ASIC 835/835a' also extracts information on the destination of the packet and passes this forwarding-related information to the Internet processor 842/842' The Internet processor 842/842' performs the route lookup using the forwarding table 844 and sends the information over to a second DBM ASIC 835b'. The Internet processor ASIC 842/842' also collects exception packets (i.e., those without a forwarding table entry) and sends them to the control component 710. The second DBM ASIC 825 (shown as a queuing and memory interface component 835b') then takes this information and the 74-byte blocks and forwards them to the I/O manager ASIC 822 of the egress FPC 820/820' (or multiple egress FPCs, in the case of multicast) for reassembly. (Thus, the DBM ASICs 835a/835a' and 835b/835b' are responsible for managing the packet memory 824/824' distributed across all FPCs 820/820', extracting forwarding-related information from packets, and instructing the FPC where to forward packets.)

The I/O manager ASIC 822 on the egress FPC 820/820' may perform some value-added services. In addition to incrementing time to live ("TTL") values and re-encapsulating the packet for handling by the PIC 810, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 822 on the egress FPC 820/820' may be responsible for receiving the blocks from the second DBM ASIC 835/835', incrementing TTL values, queuing a pointer to the packet, if necessary, before applying CoS rules, re-encapsulating the blocks, and sending the encapsulated packets to the PIC I/O manager ASIC 815.

Figure 10:
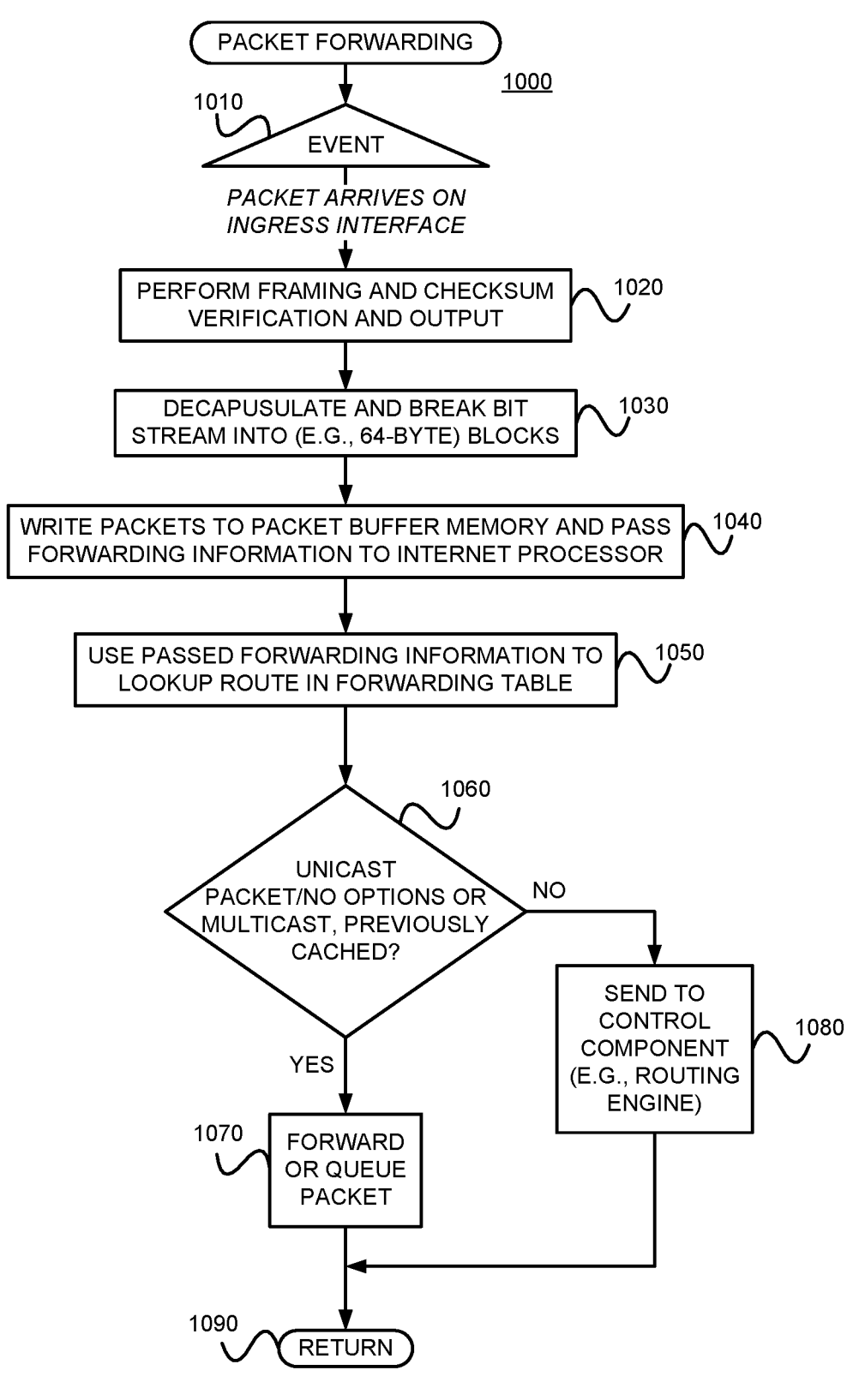
FIG. 10 is a flow diagram of an example method for providing packet forwarding in an example router.

FIG. 10 is a flow diagram of an example method 1000 for providing packet forwarding in the example router. The main acts of the method 1000 are triggered when a packet is received on an ingress (incoming) port or interface. (Event 1010) The types of checksum and frame checks that are required by the type of medium it serves are performed and the packet is output, as a serial bit stream. (Block 1020) The packet is then decapsulated and parsed into (e.g., 64-byte) blocks. (Block 1030) The packets are written to buffer memory and the forwarding information is passed on the Internet processor. (Block 1040) The passed forwarding information is then used to lookup a route in the forwarding table. (Block 1050) Note that the forwarding table can typically handle unicast packets that do not have options (e.g., accounting) set, and multicast packets for which it already has a cached entry. Thus, if it is determined that these conditions are met (YES branch of Decision 1060), the packet forwarding component finds the next hop and egress interface, and the packet is forwarded (or queued for forwarding) to the next hop via the egress interface (Block 1070) before the method 1000 is left (Node 1090) Otherwise, if these conditions are not met (NO branch of Decision 1060), the forwarding information is sent to the control component 710 for advanced forwarding resolution (Block 1080) before the method 1000 is left (Node 1090).

Referring back to block 1070, the packet may be queued. Actually, as stated earlier with reference to FIG. 8, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 822 may send a request for the packet to the second DBM ASIC 835b. The DBM ASIC 835 reads the blocks from shared memory and sends them to the I/O manager ASIC 822 on the FPC 820, which then serializes the bits and sends them to the media-specific ASIC of the egress interface. The I/O manager ASIC 815 on the egress PIC 810 may apply the physical-layer framing, perform the CRC, and send the bit stream out over the link.

Referring back to block 1080 of FIG. 10, as well as FIG. 8, regarding the transfer of control and exception packets, the system control board 840 handles nearly all exception packets. For example, the system control board 840 may pass exception packets to the control component 710.

Although example embodiments consistent with the present description may be implemented on the example routers of FIG. 6 or 7, embodiments consistent with the present description may be implemented on communications network nodes (e.g., routers, switches, etc.) having different architectures. More generally, embodiments consistent with the present description may be implemented on an example system 1100 as illustrated on FIG. 11.

Figure 11:
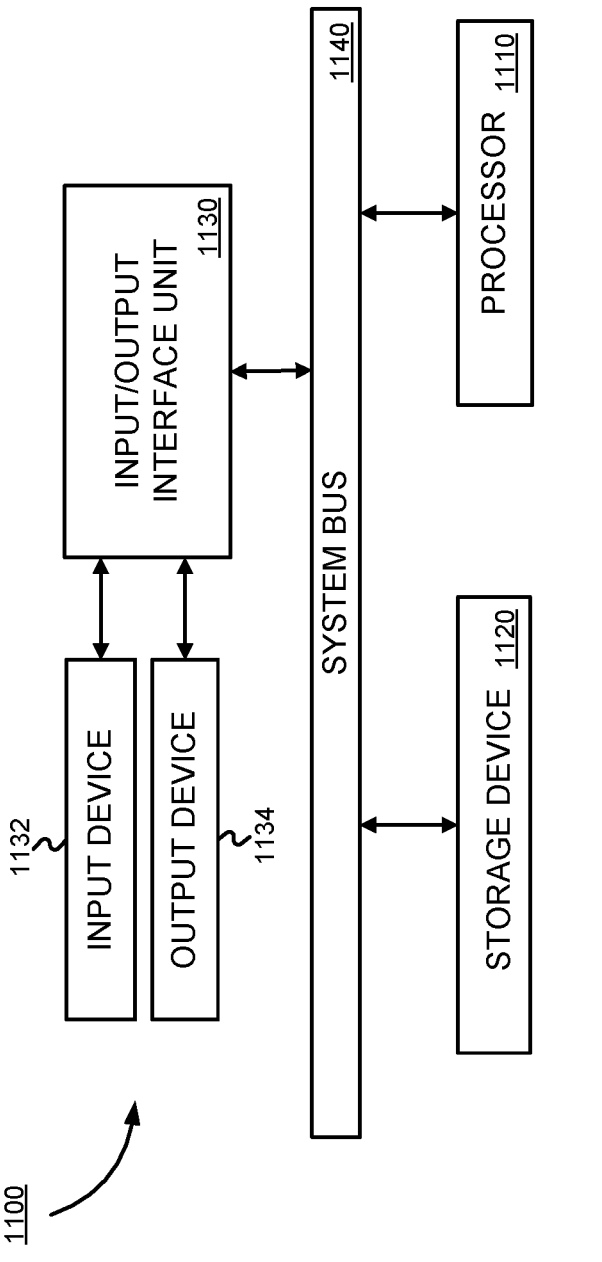
FIG. 11 is a block diagram of an exemplary machine that may perform one or more of the processes described, and/or store information used and/or generated by such processes.

FIG. 11 is a block diagram of an exemplary machine 1100 that may perform one or more of the processes described, and/or store information used and/or generated by such processes. The exemplary machine 1100 includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130. The one or more processors 1110 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1120 and/or may be received from an external source via one or more input interface units 1130. The machine executable instructions may be stored as various software modules, each module performing one or more operations. Functional software modules are examples of components of the present description.

In some embodiments consistent with the present description, the processors 1110 may be one or more microprocessors and/or ASICs. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMS, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

What is claimed is:

1. A computer-implemented method for use by a head-end router, the computer-implemented method being associated with establishing detours in a primary path of an RSVP tunnel from the head-end router to an egress router, the primary path to include at least one transit router between the head-end router and the egress router, the computer-implemented method comprising:

a) configuring the primary path to use detour local protection;

b) generating, by the head-end router, a message including (1) first data indicating whether or not a "U-Turn" label switched path (LSP) is available in the head-end router, and (2) second data indicating that the head-end router would like each of the at least one transit router in the primary path to perform a U-Turn when computing a detour LSP such that the detour LSP may only include routers on the primary path between the transit router and the head-end router and may only include links on the primary path between the transit router and the head-end router that already have bandwidth reserved for the primary path; and c) transmitting the message for receipt by each of the at least one transit router in the primary path.

2. The computer-implemented method of claim 1, further comprising:

d) configuring the head-end router to establish a secondary path of the RSVP tunnel to be in hot standby mode to the primary path, wherein RSVP shared-explicit mode is in use.

3. The computer-implemented method of claim 2, wherein bandwidth reserved on the secondary path corresponds to bandwidth reserved on the primary path.

4. The computer-implemented method of claim 2, further comprising:

e) signaling, by the head-end router, availability of the secondary path to each of the at least one transmit router in the primary path.

5. The computer-implemented method of claim 1, wherein the message is expressed by setting flags of a FAST_REROUTE object.

6. The computer-implemented method of claim 5 wherein the first data is a first flag in the FAST-REROUTE object, and wherein the second data is a second flag in the FAST_REROUTE object.

7. The computer-implemented method of claim 6, further comprising:

d) configuring the head end router to establish a secondary path of the RSVP tunnel to be in hot standby mode to the primary path, wherein the first flag indicates whether or not the head-end router desires U-Turn detour, and wherein the second flag indicates whether or not a U-Turn detour is available based on whether or not the secondary path is active.

8. The computer-implemented method of claim 5, wherein the FAST_REROUTE object is provided with "pass-through" semantics so that any routers that do not recognize the FAST_REROUTE object will forward it without any modification.

9. The computer-implemented method of claim 1, wherein the message is a FAST_REROUTE object having a custom defined C-type.

10. The computer-implemented method of claim 1, wherein the message is included in an RSVP session attribute object.

11. The computer-implemented method of claim 1 wherein the RSVP tunnel is identified by an RSVP session object.

12. The computer-implemented method of claim 1, wherein the message is included in an RSVP PATH message.

13. The computer-implemented method of claim 1, further comprising:

d) receiving, by the head-end router, a PATH message of a U-Turn detour LSP computed through it; and e) responsive to receiving the PATH message of the U-Turn detour LSP, merging, by the head-end router, the received U-Turn detour LSP with any detour LSP of the RSVP tunnel that has a common next hop with the received U-Turn detour LSP.

14. The computer-implemented method of claim 13, wherein detour path computation logic of the head-end router is configured to re-use paths of other LSPs in the same RSVP tunnel.

15. A computer-implemented method for use by a transit router, the computer-implemented method being associated with establishing detours in a primary path, to include the transit router, in an RSVP tunnel from a head-end router to an egress router, the computer-implemented method comprising:

a) receiving, by the transit router, a message including (1) first data indicating that a "U-Turn" label switched path (LSP) is available in the head-end router, and (2) second data indicating that the head-end router would like the transit router in the primary path to perform a U-Turn when computing a detour LSP such that the detour LSP may only include routers on the primary path between the transit router and the head-end router and may only include links on the primary path between the transit router and the head-end router that already have bandwidth reserved for the primary path;

b) responsive to receiving the message, computing, by the transit router, a U-Turn detour LSP
   1) using a reverse path of the primary path, from the transit router to the head-end router, and
   2) leaving a last hop of the U-turn detour LSP "loose" so that the head-end router can merge it with a secondary path in the RSVP tunnel.

16. The computer-implemented method of claim 15, wherein the reverse path of the primary path, from the transit router to the head-end router is retrieved from a Record Route Object (RRO).

17. The computer-implemented method of claim 15, further comprising:

c) detecting, by the transit router, that a next downstream node on the primary path is not reachable; and d) responsive to detecting that the next downstream node on the primary path is not reachable, sending any traffic received on the primary path onto the U-Turn detour LSP.

18. A system comprising:

a) a head-end router with (1) a primary path of an RSVP tunnel to an egress router, and (2) a secondary path of the RSVP tunnel to the egress router, wherein the secondary path is disjoint from the primary path; and b) at least one transit router on the primary path between the head-end router and the egress router, wherein one of the at least one transit router on the primary path is configured such that, responsive to determining that a next link or a next node on the primary path is unavailable for forwarding, the one of the at least one transit router performs a U-Turn detour of any packets received on the primary path so that the packets are sent back to the head-end router without using nodes or links not on the primary path whereby the links on the primary path already have bandwidth reserved for the primary path.

19. The system of claim 18, wherein the head-end router is configured such that, responsive to receiving the packets that were subject to the U-Turn detour, the head-end router forwards the packets to the egress router via the secondary path.

20. The system of claim 18, wherein RSVP shared-explicit mode is in use, and wherein bandwidth reserved on the secondary path corresponds to bandwidth reserved on the primary path.

* * * * *